United States Patent
Axtolis

(10) Patent No.: US 12,469,347 B2
(45) Date of Patent: Nov. 11, 2025

(54) SECURITY SYSTEM FOR A MOVEABLE BARRIER OPERATOR

(71) Applicant: THE CHAMBERLAIN GROUP LLC, Oak Brook, IL (US)

(72) Inventor: Robert Jude Axtolis, Naperville, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 78 days.

(21) Appl. No.: 18/518,103

(22) Filed: Nov. 22, 2023

(65) Prior Publication Data

US 2024/0144761 A1 May 2, 2024

Related U.S. Application Data

(63) Continuation of application No. PCT/US2022/031211, filed on May 26, 2022.

(60) Provisional application No. 63/194,527, filed on May 28, 2021.

(51) Int. Cl.
*H04W 12/50* (2021.01)
*G07C 9/00* (2020.01)

(52) U.S. Cl.
CPC ..... *G07C 9/00896* (2013.01); *G07C 9/00309* (2013.01); *G07C 2009/00928* (2013.01)

(58) Field of Classification Search
None
See application file for complete search history.

(56) References Cited

U.S. PATENT DOCUMENTS

| | | | | |
|---|---|---|---|---|
| 10,652,743 | B2 * | 5/2020 | Fitzgibbon | H04W 12/06 |
| 11,220,856 | B2 * | 1/2022 | Axtolis | G07C 9/00857 |
| 11,423,717 | B2 * | 8/2022 | Cate | G07C 9/00857 |
| 2008/0169899 | A1 | 7/2008 | Bauman et al. | |
| 2015/0302731 | A1 | 10/2015 | Geerlings et al. | |
| 2015/0302738 | A1 | 10/2015 | Geerlings et al. | |
| 2017/0221352 | A1 | 8/2017 | Geerlings et al. | |
| 2019/0200225 | A1 * | 6/2019 | Fitzgibbon | H04W 12/06 |
| 2020/0318414 | A1 | 10/2020 | Axtolis | |
| 2024/0005713 | A1 * | 1/2024 | Axtolis | H04W 12/50 |
| 2024/0036529 | A1 * | 2/2024 | Axtolis | G05B 13/0265 |

FOREIGN PATENT DOCUMENTS

CN 107331142 A 11/2017

OTHER PUBLICATIONS

International Search Report and Written Opinion by the ISA/AU, mailed Nov. 29, 2022, in PCT Application No. PCT/US2022/031211, 9 pages.
EPO, Extended European Search Report, dated Mar. 12, 2025, in EP Application No. 22812199.2, 8 pages.
European Patent Office; Communication pursuant to Rules 161(2) and 162 EPC; dated Jan. 9, 2024; in connection with EP Application No. 22812199.2; 3 pages.

\* cited by examiner

*Primary Examiner* — K. Wong
(74) *Attorney, Agent, or Firm* — Foley IP Law, PLLC

(57) ABSTRACT

Systems are provided for secure actuation of a device such as a moveable barrier operator. In certain embodiments, portions of communications are configured in order to cause information to be added to or deleted from a memory of one of the devices.

15 Claims, 29 Drawing Sheets

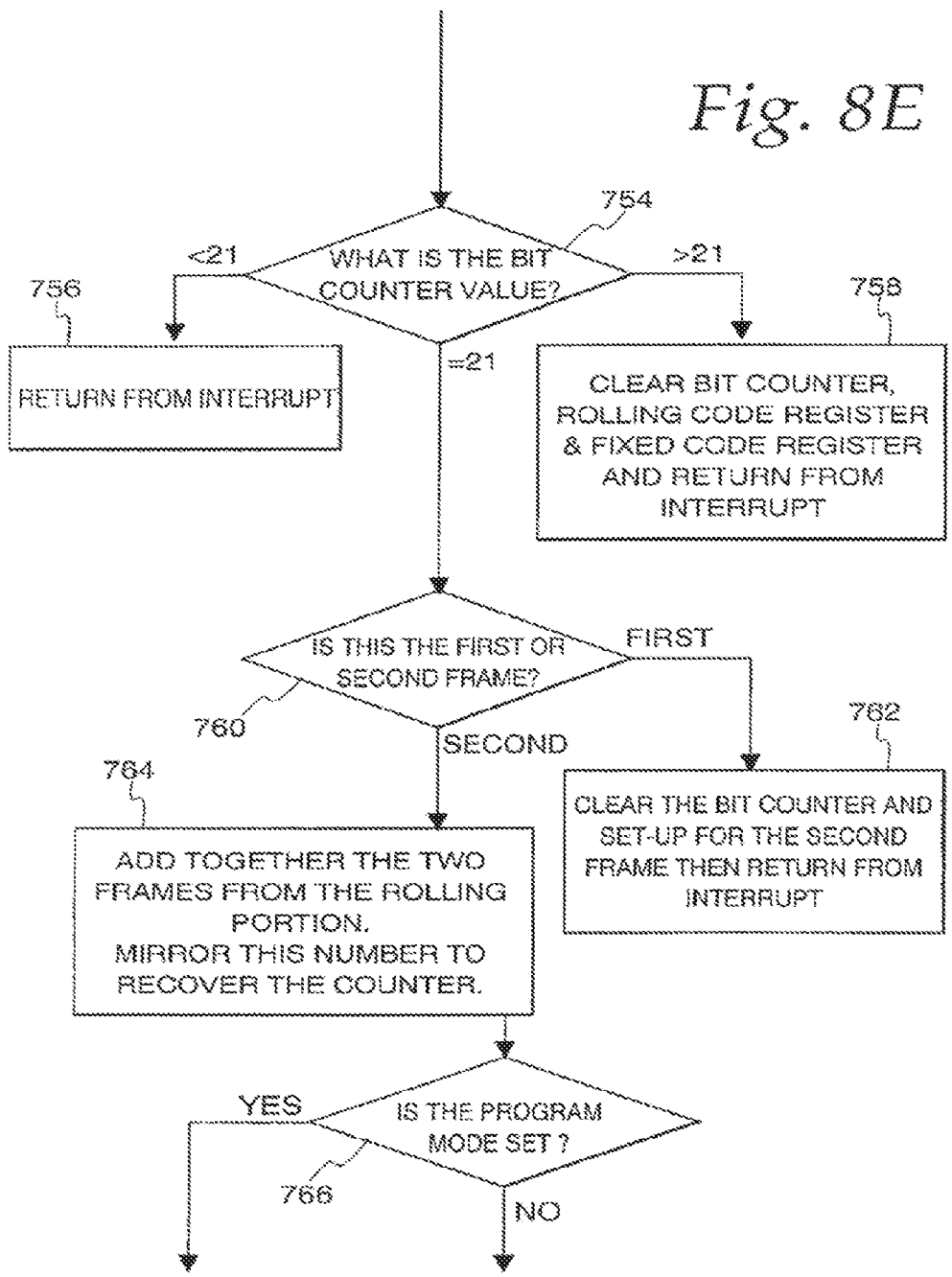

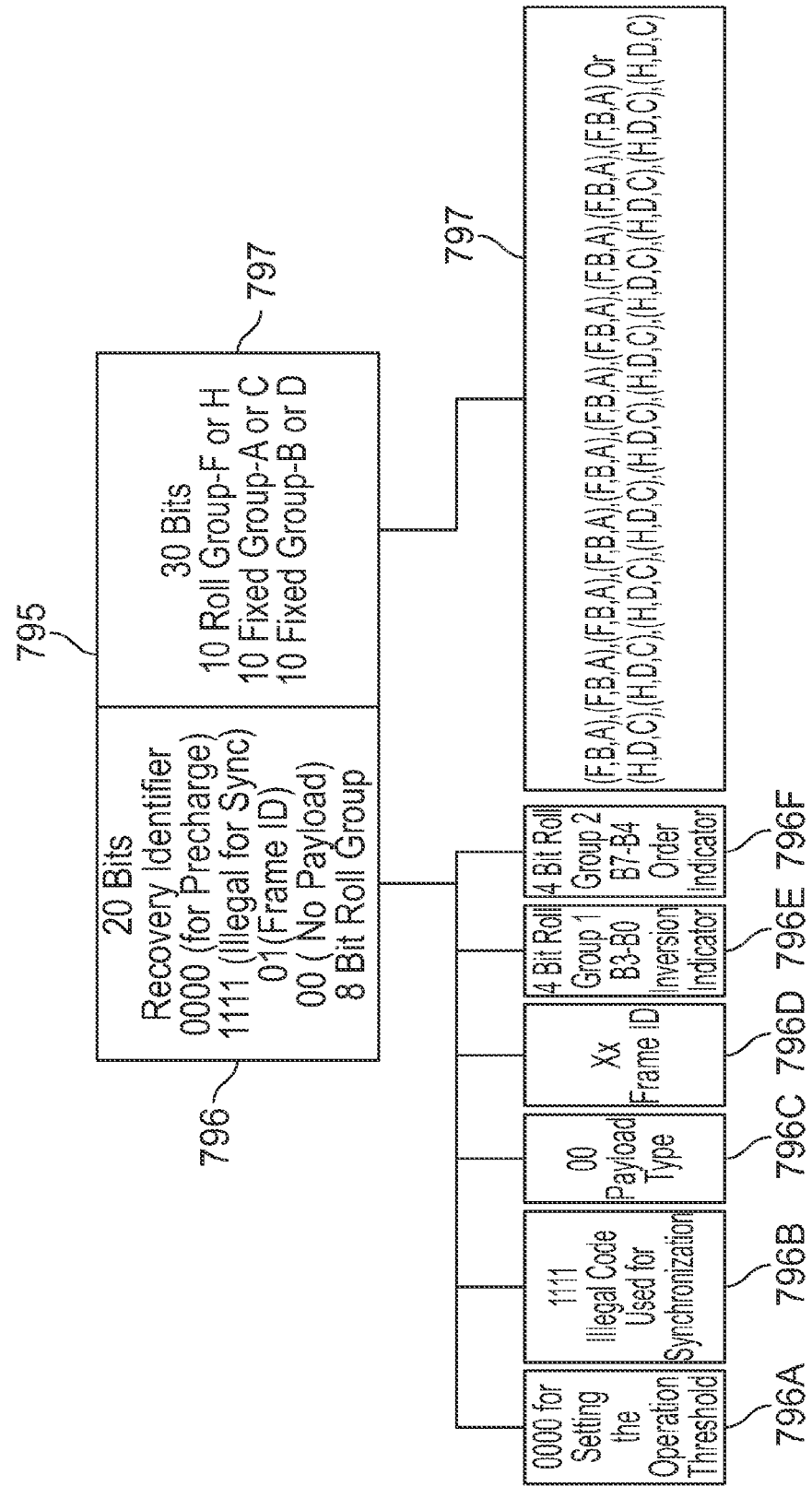

SECURITY SYSTEM FOR A MOVEABLE BARRIER OPERATOR

CROSS-REFERENCE TO RELATED APPLICATIONS

This application is a continuation of PCT Application No. PCT/US2022/031211, filed May 26, 2022, which claims the benefit of U.S. Provisional Application No. 63/194,527, filed May 28, 2021. The disclosures of which are hereby incorporated by reference in their entirety.

FIELD

This disclosure relates in general to security systems that allow operation upon the receipt of a properly coded signal. More particularly, the disclosure relates to a security system or to a barrier operator system, such as a garage door operator, employing a transmitter and a receiver that communicate via messages or codes, including codes having at least a portion thereof that changes with operations of the transmitter.

BACKGROUND

It is known in the art to provide moveable barrier operators, such as gate operators, garage door operators, or other barrier operators that include an electric motor connectable through a transmission to a door, gate, or other moveable barrier that is to be opened and closed. Because many of these systems are associated with residences, as well as with garages, it is important that opening of the barrier be permitted only by one who is authorized to obtain entry to the area protected by the barrier. Some barrier operator systems have in the past employed mechanical lock and key arrangements associated with electrical switches mounted on the outside of the garage. While these systems enjoy a relatively high level of security against tampering, they are inconvenient to use and may present safety concerns by requiring the user to exit their vehicle to open the barrier.

It is also well known to provide radio-controlled gate or garage door operators, which include an operator unit having a radio receiver and a motor connected to the barrier. The radio receiver is adapted to receive radio frequency signals having particular signal characteristics that, when received, cause the door to be opened. Such systems can include radio transmitters employing coded transmissions of multiple or three-valued digits, also known as "trinary bits" or other serial coded transmission techniques. Many moveable barrier operators, for example, garage door operators, use activation codes that change after each transmission. Such varying codes, called rolling access codes, are created by the transmitter and acted on by the receiver, both of which operate in accordance with the same method to predict a next rolling access code to be sent and received. One such rolling type access code includes four portions, a fixed transmitter identification portion, a rolling code portion, a fixed transmitter type identification portion, and a fixed switch identification portion. In this example, the fixed transmitter identification is a unique transmitter identification number. The rolling code portion is a number that changes every transmission to confirm that the transmission is not a recorded transmission. The fixed transmitter type identification is used to notify the moveable barrier operator of the type and features of the transmitter. The switch identification is used to identify which switch on the transmitter is being pressed, because there are systems where the function performed is different depending on which switch is pressed.

While security systems have become more sophisticated, persons wishing to gain unauthorized access to commit property or person-related crimes have become more sophisticated as well. It is known in the security industry today that devices are being made available that can intercept or steal rolling code.

Methods also exist for pairing one or more remote control devices with a barrier operator so that one or more users may utilize multiple control devices for use with a single barrier operator or utilize a control device that was not specifically manufactured to be used in conjunction with a specific moveable barrier operator, as in the case of replacement transmitters or transmitters integrated into a vehicle. In existing systems, when a moveable barrier operator is installed, the homeowner typically receives at least one handheld controller that is already trained to the operator. To operate the door from a new secondary control device, there is generally a two-step learning procedure for training the new secondary control device. The first step is to teach the secondary control device the type and potentially the code (or code format/parameters) of the original control device. For instance, while holding the original controller a few inches from the secondary control device, the owner may press and hold the original controller's button at the same time as pressing a learn button on the secondary control device to teach the access code type and frequency to the secondary control device. The second step of the learning process is to train the secondary control device to the operator. To do this, the learn button on the operator is pressed, and within a given time period the secondary control device should be activated. In another prior approach, these two steps are combined into a single step or done simultaneously. In one example, a pre-trained transmitter transmits a code to both an operator and a secondary control device, which both save the code. Next, within a predetermined amount of time, the button is pressed on the secondary control device to transmit a second rolling access code, which is received by the operator and compared with the first rolling-type access code saved in the operator. If a predetermined correlation exists between the first rolling type access code and the second rolling type access code, the operator stores the representation of the second rolling type access code from the secondary control device. Requiring that a user physically possess a pre-trained transmitter to train a secondary control device to a moveable barrier operator according to this approach ensures that the user is authorized to access the garage. Some systems even allow a universal control device to learn a credential from a moveable barrier operator by establishing a bidirectional communication between the universal control device and the moveable barrier operator, upon the occurrence of a predetermined event, without the use of a preprogrammed transmitter.

SUMMARY

The present disclosure relates in general to an electronic system for providing security for actuation of a particular device. The system may be useful, for instance, in a moveable barrier operator system such as a garage door operator system by allowing the barrier to be opened and closed while preventing access to the garage without authorization. Moveable barriers for use in connection with the present disclosure may include one-piece and sectional garage doors, pivoting and sliding gates, doors and cross-arms, rolling shutters, and the like. In general, a moveable barrier operator system for controlling such a moveable barrier includes an operator coupled to the corresponding moveable barrier and configured to cause the barrier to move (typically between closed and opened positions) in response to actuation of a controller, such as via a remote control device that communicates with the operator through a wireless technique such as transmission of a radio signal or message at one or more frequencies.

Some systems according to the present disclosure provide enhanced security through bidirectional communication in which first and second devices, such as a control device and a moveable barrier operator, both transmit and receive independent messages or codes to validate a transaction between devices both on the first device end and on the second device end. Some examples of such bidirectional communication and related systems are described in U.S. patent application Ser. No. 16/226,066, the disclosure of which is hereby incorporated by reference as if fully set forth herein. Some embodiments provide enhanced security by linking information relating to timing of subsequent transmissions to the encrypted transmissions, and entail receipt of responsive transmissions within a specified time window as a prerequisite for code validation. These enhanced security measures may also be used in methods of pairing and/or synchronizing devices. In some forms, the barrier operator may determine, based on signals received from a control device or based on specific criteria or settings, that the bidirectional communication protocol should be modified and instruct the controller not to store or validate incoming transmissions to avoid potential problems where a plurality of controllers are used to activate an operator.

In some embodiments, a method may be provided for a first device to communicate with another device and trigger a subsequent response from that other device. The first device may be, for instance, a handheld or vehicle mounted control device, and may be user-operated or triggered by a geofence, proximity detection, or other factors. The first device may in some forms be generally configured for developing and transmitting via wireless signals a first message, such as an encrypted message comprising a fixed code and a changing or variable code (such as a rolling code). The changing or variable code is, in some forms, changed with each actuation of the control device. The fixed code is, in some forms, static and remains the same for each actuation of the control device. In some forms, one of a plurality of fixed codes may be selected to provide information regarding the state of the device or convey instructions from one device to another. In some aspects, a second device, for example an operator such as a motorized garage door opener, receives the first message from the first device, validates the first message (for example by comparing information associated with the fixed code and the changing or variable code to stored values, which are preferably stored in a computer memory physically incorporated into the second device), and upon validation sends a response signal including at least a second message, such as a second encrypted message having a second fixed code and a second changing code. Information associated with the fixed code and changing/variable code may be, in some forms, the fixed code and changing/variable codes themselves, portions thereof, or information derived from the fixed code and changing/variable codes. In some forms, the first device then receives and attempts to validate the second message, and in some embodiments, the first device is configured to transmit a third message to the second device. The third message may be, for instance, a third encrypted message including the first fixed code and a changed version of the second changing code. This third message is configured to effect performance of an action by the second device, such as lifting, lowering or otherwise moving a moveable barrier.

In some forms, a system of secure communication between a first device and a second device is provided to effect an action by the second device. In some embodiments, the first device comprises a controller circuit; a transmitter in operative communication with the controller circuit; a receiver in operative communication with the controller circuit; and a user input device in operative communication with the controller circuit. In some forms, a single transceiver may be employed rather than a separate transmitter and receiver. The controller circuit of the first device may be configured to, in response to detecting an input at the user input device, control the transmitter to transmit a first encrypted message that includes at least a first fixed code and a first changing code; receive through the receiver a response from the second device, wherein the response comprises a second encrypted message including a second fixed code and a second changing code; validate the response by comparing the second fixed code and the second changing code to second stored information; and in response to validating the response, control the transmitter to transmit a third encrypted message including at least the first fixed code and a changed version of the second changing code, wherein the third encrypted message is configured to effect performance of an action by the second device. The second device may in some embodiments comprise a controller circuit; a transmitter in operative communication with the controller circuit; a receiver in operative communication with the controller circuit; and a timer circuit in operative communication with the controller circuit. The controller circuit of the second device may be configured to enable receiving the first encrypted message by the second device's receiver; validate the first encrypted message by comparing the first fixed code and the first changing code to stored code values; determine when to transmit a response; in response to validating the first encrypted message, control transmitting the response from the second device's transmitter; enable the second device's receiver to receive the third encrypted message; validate the third encrypted message by comparing the first fixed code and the changed version of the second changing code to stored code values; and effect performance of an action in response to validating the third encrypted message.

The fixed and variable codes may be of any selected length and may be adapted or altered in various ways in order to add additional layers of security and/or functionality. In some embodiments, a system may be adaptable to one or more configurations in which a single operator is controlled either by a single transmitter or by a plurality of transmitters. In some forms, the system may include a bidirectional encryption method where each of the transmitter and operator transmit encrypted messages that include unique fixed and changing codes, and in certain forms the bidirectional communication of changing codes may be selectively halted, paused, or bypassed in order to permit a number of transmitters to control a single operator without the operator keeping track of unique sequences of changing code values for each individual transmitter and without causing one or more transmitters to fail to validate communications from the operator due to operator interaction with one or more other transmitters. The ability to engage and disengage bidirectional communication of changing codes is especially useful, for instance, in the case of a moveable barrier for a gated community, private parking garage, apartment complex, or other space in which a plurality of independent residents require access to a single door or gate that is opened and closed by the operator.

Also provided is a method of pairing a first device and a second device to establish secure communication between the first device and the second device. A first device transmits to a second device a first message (such as an encrypted message that includes at least a first fixed code and a first changing code). The second device receives the first encrypted message while the second device is in a "learn" mode in which the second device is waiting for signals from a transmitter without the second device having stored information regarding the current version of the changing code of the first device (or while the second device ignores stored information regarding the changing code of the first device). While in learn mode the second device stores the first encrypted message. In some embodiments, the second device may have been placed in learn mode manually by a user, such as by pressing a button, switch, or lever on the second device, and thus in some embodiments placing the second device in learn mode may entail generally simultaneous manual activation of both the first and second devices. The second device may be configured to terminate learn mode within a specified time window, for instance within five, ten, or twenty seconds of an action that places the second device in learn mode.

While the second device is in learn mode, upon validation of the first message the second device transmits its response, a second encrypted message comprising a unique identifier associated with the second device, to the first device. The second encrypted message may also comprise a second changing code, and may further comprise instructions for the first device regarding whether to store information relating to the identifier associated with the second device. When the responsive second encrypted message is received by the first device, the response (or one or more portions or information derived therefrom) is either stored or not stored in a memory of the first device depending on instructions received from the second device. Subsequently, the first device transmits to the second device a third encrypted message including at least the first fixed code and a changed version of the first changing code. In some cases, the first device may require validation of the second encrypted message, for instance by determining whether the second encrypted message is received within a preset time window. The second device receives and validates the third encrypted message by comparing the first fixed code and the changed versions of the first changing code to stored code information relating to the first encrypted message (e.g. the first fixed code and first changing code, portions thereof, or information derived therefrom), and upon validation (e.g. by confirming that the changed version of the first changing code is one change forward of the changing code from the first encrypted message) the second device then transmits a fourth encrypted message including the second fixed code and a second changing code (which may be independent of the first changing code). The first device receives the fourth encrypted message, and if instructed to do so by the second device, stores information relating to the fourth encrypted message. If the first device has been instructed by the second device not to store information associated with messages from the second device, the first device will receive the fourth encrypted message, and may validate the fourth encrypted message in a manner other than comparing the fourth encrypted message to a prior stored message, but will not store information relating to the fourth encrypted message.

In some forms, a method of pairing a control device and an operator device that has been placed in a learning mode is provided wherein the control device transmits a first encrypted message that includes at least a first fixed code and a first changing code; the operator device receives the first encrypted message while the operator device is in a learning mode, stores the first encrypted message, determines whether the control device should store information from a second encrypted message based on at least a portion of the first encrypted message, and transmits a response from the operator device comprising the second encrypted message and instructions regarding storing of information associated with the second encrypted message (e.g. a second fixed code and/or second changing code). The instructions transmitted by the operator device may, for instance, instruct the control device to ignore the second encrypted message, avoid storing the encrypted message or parts thereof, store the encrypted message, or proceed with preset or default protocol. In this manner, the operator device may proceed with bidirectional encrypted validation (in which both the control device and operator device send encrypted messages and analyze at least one encrypted message from the other device) with certain control devices and unidirectional encrypted validation (wherein only the operator device analyzes encrypted messages) with other control devices without a completely separate communication protocol or pathway. The instructions transmitted to the operator may be a bit, byte, or sequence of bits or bytes in the second message that is configured to cause the control device to either store or avoid storing specific information from the second message.

In certain embodiments, the operator device makes a decision regarding whether to proceed with unidirectional or bidirectional encrypted communication based on the type of control device, the type of signal transmitted by the control device, and/or an identification code transmitted by the control device. For instance, the operator device may perform a step of determining whether the control device will store information based on a classification of the control device (e.g. the type or configuration of control device communicating with the operator device) based on information relating to the first encrypted message (e.g. the first fixed code, a portion thereof, or information derived therefrom), based on a separate encrypted or unencrypted signal received from the control device, or based on other factors or criteria. In some forms, the operator device may instruct the control device regarding storing information via an instruction portion of the second encrypted message, or alternatively send a separate instruction message or payload. The instruction portion or instruction message may, for instance, in some forms comprise either an instruction to store the second fixed code and second changing code, an instruction not to store the second fixed code and second changing code, or an omission of a specific instruction so that the control device proceeds with a default protocol or pathway.

If the instructions from the operator device result in the control device not storing information associated with the second encrypted message (such as the second encrypted message itself, the second fixed code and second changing code of the second encrypted message, one or more portions thereof, or information derived therefrom), the control device will transmit to the operator a third encrypted message including at least the first fixed code and a changed version of the first changing code, the operator device will receive and compare the first fixed code and the changed version of the first changing code to stored code values from the first encrypted message. If the third encrypted message is validated based on comparison of the first fixed code and the changed version of the first changing code to stored code values, for instance by comparing the changed version of the first changing code to an expected value derived from stored code values, then the operator will transmit to the controller a fourth encrypted message including the second fixed code and a second changing code, resulting in pairing of the devices. The fourth encrypted message may include instructions regarding storing the fourth encrypted message, one or more portions thereof, or information derived therefrom.

In similar fashion, a method of operating a control device to effect an action by a an operator device may be provided wherein the operator chooses between bidirectional encrypted communication and unidirectional encrypted communication based on a classification of the first device (e.g. the type or configuration of control device communicating with the operator device), based on at least a portion of the first encrypted message (e.g. the first fixed code or a portion thereof), based on a separate signal received from the control device, or based on other factors or criteria. For instance, in some forms the control device transmits a first encrypted message that includes at least a first fixed code and a first changing code; the operator device receives the first encrypted message, stores information relating to the first encrypted message, determines whether to instruct the control device to validate a response from the second device based on at least a portion of the first encrypted message; and transmits a response to the control device comprising a second encrypted message including a second fixed code and second changing code, as well as instructions regarding validating the second fixed code and/or second changing code. The instructions regarding validating the second fixed code and/or second changing code may be part of the same transmission as the second encrypted message, or alternatively may be contained in a separate transmission. If the control device is instructed not to validate the second encrypted message, the control device will transmit to the operator a third encrypted message including at least the first fixed code and a changed version of the second changing code to be validated by the operator, and if the operator validates the third encrypted message the operator will effect a programmed action such as moving a physical barrier.

In some forms, the present disclosure relates to an apparatus configured to effect an action upon communication with a control device, the apparatus comprising a controller circuit, as well as a transmitter and receiver (or transceiver in place of a separate transmitter and receiver) in operative communication with the controller circuit, wherein the controller circuit is configured to (a) control the receiver to receive a first encrypted message from the control device that includes at least a first fixed code and a first changing code, (b) control the transmitter to transmit a response to the control device, the response comprising a second encrypted message and instructions for the remote device regarding whether to attempt to validate the second encrypted message. In some forms, the second encrypted message and instructions regarding whether to attempt to validate the second encrypted message may be parts of a single transmission, and in other forms may be conveyed in multiple transmissions. In some forms, a portion of the second encrypted message instructs the device whether to validate the second encrypted message or portions thereof. The controller circuit of the apparatus may, in some forms, further control the receiver to receive a third encrypted message from the remote device sent in response to receipt of the second encrypted message, the third encrypted message including at least the first fixed code and a changed version of the second changing code. In some forms, the controller circuit may be further configured to effect performance of an action by the apparatus, such as opening or closing a physical barrier such as a garage door or gate, based on a comparison of at least a portion of the third encrypted message to stored code values.

Some forms of the present disclosure may include a non-transitory computer readable medium having stored thereon instructions that when executed by a controller circuit of a second device cause the controller circuit to perform operations of communicating with a first device to effect an action by the second device, the operations comprising receiving from the first device a first encrypted message that includes at least a first fixed code and a first changing code; determining by the second device, based on information relating to at least a portion of the first encrypted message, whether to instruct the first device to validate a response from the second device; transmitting the response from the second device, wherein the response comprises a second encrypted message including a second fixed code and second changing code, at least a portion of the second encrypted message instructing the first device regarding validating the second fixed code and second changing code; receiving by the second device a third encrypted message including at least the first fixed code and a changed version of the second changing code; and effecting performance of the action by the second device upon comparing at least a portion of the third encrypted message to stored code values.

When a first device (e.g. controller) and a second device (e.g. operator) are configured for bidirectional learning in which each device stores fixed and changing codes received from the other device, in some instances both the first and second device may be configured with a "learn" mode instead of only providing a learn mode for the second device as previously described. When both the first device and the second device are configured with learn modes and operation modes, the second device is able to prioritize learning or pairing with the first device if the first device is also set to learn mode such that the second device may be configured to attune to or focus on the first device or otherwise disregard if one or more additional devices similar to the first device are activated within close proximity to the second device while the second device is in learn mode. In some embodiments, when the second device is in learn mode, the second device may be configured to altogether ignore signals from devices that are not placed in learn mode in order to avoid accidentally learning devices that have not been specifically selected by a user to be associated with the second device. In order to allow such selective or prioritized learning without adding steps to the learning process, the devices may be configured to include within their outgoing messages an indicator that the transmitting device is in learn mode. In one example form, the changing code of a message may be set to a specific value that is recognized by the device receiving the message as an indicator that the device that sent the message is in learn mode. For instance, in a first device that sends messages that include a fixed code and a rolling code, during learn mode a non-transitory computer readable medium having instructions stored thereon may cause a control circuit to set the rolling code to a specific value representing a "learning roll," in some cases a low value such as "0" or "1" that is unlikely to be mistaken for a non-learning rolling code used in operation mode. Ordinarily a rolling code is configured to advance with each operation of the device from which it is sent, and therefore setting the learning roll as a low value avoids situations where use of a device in operation mode inadvertently advances the rolling code to a learning roll value. The second device that receives a message from the first device may be configured to recognize the set value as a learning roll (for instance by comparing the rolling code to data in a lookup table) and accordingly de-prioritize or ignore other incoming messages. In some forms, the second device may be configured to initiate a timer upon receiving a first message in order to determine if there are any other messages received within a preset time window that include a learning roll and should be prioritized over the first message. Once the second device determines that the first device should be learned, the first and second devices exchange fixed and changing codes according to their standard learning process. If one or more additional devices that are also set to learn mode contact the second device within the time window in which the communication from the first device is received, in some embodiments other criteria may be used to further prioritize learning of "learn mode" devices by the second device. For instance learning of two or more devices may be prioritized based on the fixed codes identifying the devices, information regarding device types contained within messages from the devices, payloads contained within messages from the devices, the time at which messages were received, or other information.

Specific changing code values may also be configured to cause devices to take other actions. For instance, one device may have a non-transitory computer readable medium having instructions stored thereon that when executed by a control circuit cause the control circuit to set a changing code value that is understood by the other device as an instruction to "unlearn" the sending device, resulting in the device receiving the message to remove the sending device from a list of learned devices and delete associated information from the memory of the receiving device. This unlearn method allows a user to actuate a single device in an "unlearn mode" to remove information about the other device from both device memories without any need to have an interface on one or both devices that allows the user to select which devices to remove from a learned state. This also allows a first device to automatically instruct a second device to unlearn the first device and remove information regarding the first device from memory when the first device is instructed to unlearn the second device, making sure that both devices of a system that involves bidirectional exchange of changing codes remove unnecessary information when unpaired.

In some embodiments, a simplified pairing function is also provided in which an operator or other device is provided in a "pre-learn" or "auto learn" configuration in which the device is ready to engage in a learning protocol upon communication from another device without being set in a learning mode (such as by actuation of a manual DIP switch or the like to a "learn" position). This simplified pairing function can reduce the burden on the manufacturer by eliminating pairing steps normally conducted by the manufacturer, speeding up production. This can be especially advantageous in certain instances for systems involving bidirectional learning where each device learns the other by storing and validating fixed and/or variable codes associated with the other device. In some aspects, a manufacturer performs one or more steps to place a device in a pre-learn configuration, and then a user or purchaser of the device actuates another device to automatically initiate the pairing function. In other aspects, a user places a device in a pre-learn configuration with an application on a smartphone, tablet, or other computer to inform the device to learn another specific device automatically when discovered. This reduces the time spent pairing devices by the manufacturer and allows an end user to pair the devices with, for example, a single action, such as a single push of a button of a control device such as a transmitter sold with the operator. The pre-learn or auto-learn feature also is specific to identified peripheral devices, ensuring that a device only enters learn mode when contacted by a correct peripheral device.

In the pre-learn configuration, a device such as an operator may be configured to automatically store a first variable code transmitted with a first fixed code and received by the operator due to actuation of another device such as a control device, subject to validation of only the fixed code by confirming that the first variable code matches a preset fixed code stored in a memory of the operator. The operator then provides a response that comprises a second fixed code associated with the operator, and also in some forms a learning variable code or other information confirming to the controller that the operator is in a learning mode, initiating a learning protocol between the control device and operator. Upon completion of the learning process, the operator exits the pre-learn configuration to prevent inadvertent activation of the learning process.

BRIEF DESCRIPTION OF THE DRAWINGS

FIGS. 8A-F are flow charts showing examples of operation of a receiver of one of the first and second devices;

FIG. 8H is an example message diagram in accordance with one example of an encrypted message.

Figure 1:
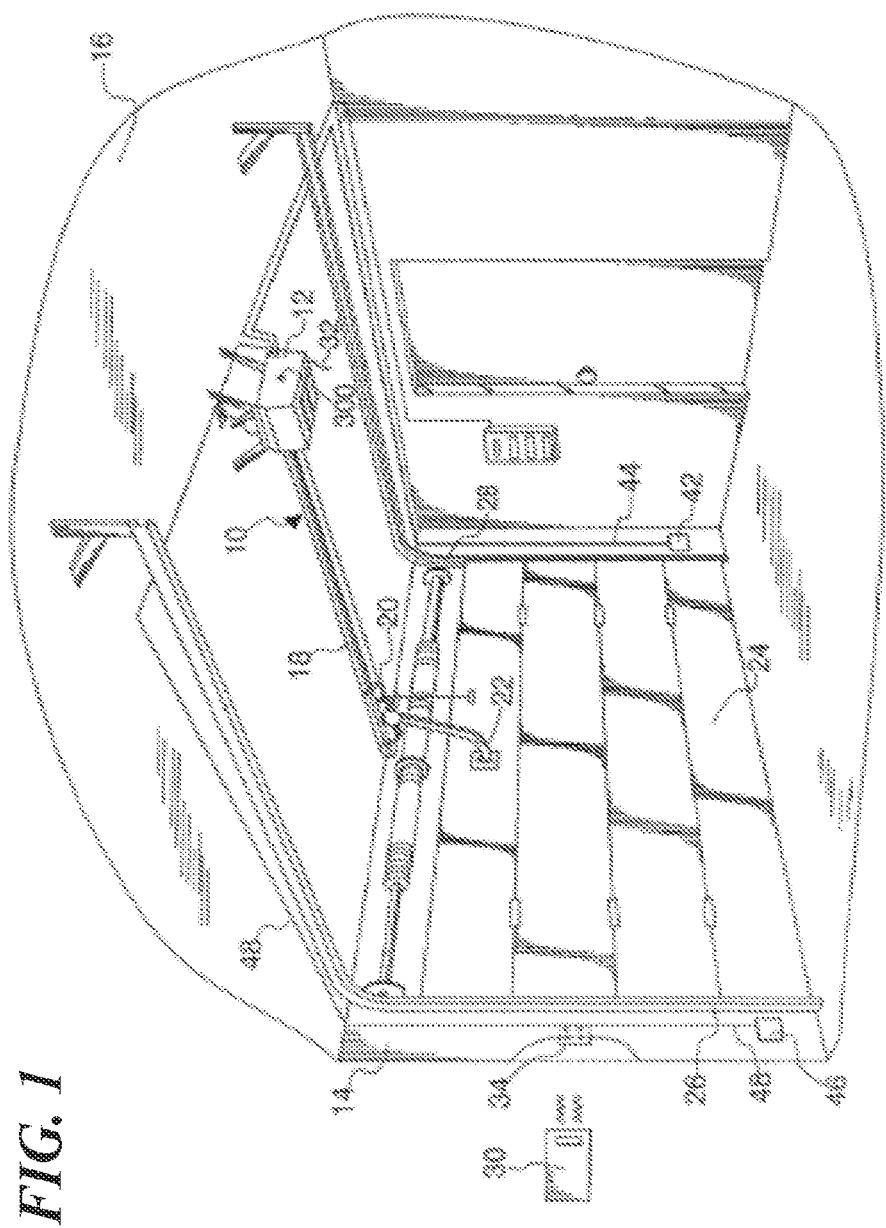
FIG. 1 is a perspective view of an example moveable barrier operator system that receives control signals from a user-operated control device.

Skilled artisans will appreciate that elements in the figures are illustrated for simplicity and clarity and have not necessarily been drawn to scale. Common but well-understood elements that are useful or necessary in a commercially feasible embodiment may be omitted for simplicity and/or clarity. It will further be appreciated that certain actions and/or steps may be described or depicted in a particular order of occurrence while those skilled in the art will understand that such specificity with respect to sequence is not actually required.

DETAILED DESCRIPTION

In some forms, the systems and methods described herein may include a user-actuated first device, for instance a handheld or vehicle mounted control device, generally configured for developing a first encrypted message comprising a fixed code and a changing or variable code (such as a rolling code). The changing or variable code may be changed with each actuation of the control device according to a set sequence or protocol accessible by the first device and a second device with which it communicates. The fixed code remains the same for each actuation of the first device. The second device may comprise an operator mechanism, such as a motorized barrier (e.g. garage door or gate) opener, to induce one or more actions when commanded by the first device. The first and second device may be configured to communicate with one another by various techniques, for example a wired communication path, radio frequencies, or any variety of proprietary wireless platforms.

In certain embodiments, the second device receives the encrypted message from the first device, validates the message by comparing the fixed code and changing or variable code to stored information and, upon validation, sends a response signal including at least a second encrypted message having a second fixed code and a second changing code that is independent from the first changing code. The stored information may represent, for instance, fixed and changing values from prior operations with a sequence or algorithm associated with the changing code to determine changing code values. In some embodiments, the second device may recognize a plurality of changing code values as valid in order to account for accidental or otherwise ineffective actuation of the first device (such as when outside of the range of the second device or when interference prevents normal communication with the second device.)

In some forms, the second device can determine, based on preset conditions, whether the first device should validate subsequent communications from the second device to the first device. For instance, in some cases the first device is in a default state wherein the first device receives and attempts to validate the second encrypted message, and upon validation is configured to transmit a third encrypted message to the second device, the third encrypted message including the first fixed code and a changed version of the second changing code. However, if the second device determines that the first device should not proceed in the default state, the second device may transmit a signal instructing the first device to initiate an alternative protocol in which the first device receives the second encrypted message without storing any information associated with the second encrypted message and without attempting to validate the second encrypted message. This alternative protocol prevents failure of validation in situations where one or more alternative devices besides the first device are used in connection with the second device and have initiated actions with the second device that could cause a changing code portion of the second encrypted message from the second device to not match expected values determined from values stored in a memory of the first device. In other words, the alternative protocol is configured to be triggered under circumstances where the second device may have changed its changing code one or more times in response to interactions with authorized devices other than the first device, for instance where the second device is a moveable barrier operator for an apartment complex, condominium association, gated community, or other multi-unit dwelling area where a plurality of independent users have access to a given entry point and each utilize different remote control devices for activating the moveable barrier operator.

The third encrypted message, sent by the first device in response to validation of the second encrypted message or in response to receipt of instructions from the second device to initiate the alternative protocol, is configured to effect performance of an action by the second device, such as lifting, lowering, sliding, pivoting, opening, closing or otherwise moving a moveable barrier upon validation by the second device based on comparisons to stored information. Alternatively, the communication between the devices may, in some embodiments, involve additional exchanges of messages prior to effecting performance of an action by the second device in order to further improve security, for instance transmission and validation of fourth and fifth encrypted messages containing fixed codes and changing codes.

The ability of the second device to instruct the first device to proceed either in a default protocol or in an alternative protocol permits communication between the devices to involve bidirectional validation of messages wherein each of two devices are configured to both transmit and receive messages and compare the messages to stored information (such as values from prior communications between devices) where maximum security is desired or, alternatively, unidirectional validation of messages originating only from one device where one device is required to interact with numerous other devices. The alternative protocol allows the second device, such as a moveable barrier operator device, to utilize either bidirectional or unidirectional validation systems as desired without the need to reconfigure the device or actively switch the operator via human intervention from the default protocol to the alternative protocol and vice versa. Activation of an alternative protocol also allows one or more remote control devices to be exempt from the bidirectional validation protocol without the need for the operator to store independent changing code values or sequences for each exempt control device, thus allowing for the operator to be paired to tens, hundreds, or even thousands of devices without requiring unduly large amounts of memory space to store information relating to thousands of prior interactions with the control devices. The second device may determine whether to instruct the first device to proceed with the default protocol or alternative protocol based on any desired criteria. For instance, the second device may have stored in its memory a list of device types, models, codes, or characteristics that qualify certain devices for the alternative protocol. For instance, in some forms the second device will, upon receipt of a transmission from the first device, compare one or more pieces of transmitted information to information stored in a database in order to determine the appropriate protocol for the second device, and then transmit information to the first device instructing the first device to proceed with the appropriate protocol. In some forms, the second device determines how to instruct the first device by comparing a fixed code, or a portion thereof, transmitted by the first device to the second device against stored information. In other forms, the second device is configured to determine the appropriate protocol based on the length of a message received from the first device, the format of the message received from the first device, a separate signal transmitted by the first device within a specified time window of an encrypted message, or other factors. The instruction from the second device to the first device relating to the protocol with which the first device is to proceed may likewise take a number of forms. For instance, the first device may default to a bidirectional validation state and change to an alternative unidirectional validation state only upon receipt of a valid instruction from the second device. Alternatively, the first device may default to a unidirectional validation state and change to an alternative bidirectional validation state only upon instruction from the second device. In some forms, the first device may not have a default protocol such that the first device depends on the second device to provide instructions for one of a plurality of protocols. And in some other forms, the second device does not transmit an instruction to the first device, for instance where the first device is preconfigured to operate in a specific state or where the first device determines the appropriate protocol.

In some embodiments, at least one time window is associated with one or more of the encrypted messages to provide an additional layer of security and minimize the opportunity for third parties to intercept transmissions and utilize the fixed and changing codes without the device owner's consent. For instance, in some such embodiments where a time window is associated with the first exchange of encrypted messages, upon actuation the first device determines a time window in which to expect to receive a response as it transmits the first encrypted message including at least a first fixed code and a first changing code. In some embodiments, the time window may be determined at least in part based on one or more portions of the encrypted message, so that the time window itself acts as an additional layer of encryption. For instance, specific lengths of time may be associated with specific values or digits in the fixed code portion of the message so that a specific time window is linked to the first device or associated with specific values or digits in the changing code portion of a message so that the time window varies with each actuation of the first device. The second device receives the encrypted message and validates the message by comparing the fixed code and changing or variable code to stored values. The second device then determines a second time window in which to transmit a response to the user-operated transceiver based on the encrypted message, with the second time window being the same as or within the time window determined by the first device and may or may not be determined using the same portion of the encrypted message. In some embodiments, the second time window may be a discrete point in time, with or without a margin of error, that lies within the first time window. When the second device validates the encrypted message, the second device then sends a response signal within the second time window. The response signal includes a second encrypted message, which may be, for instance, a message comprising a second fixed code and a second changing code that is independent from the first changing code. The first device may be configured to ignore responses received by the first device outside of the first time window but validate responses received within the time window calculated by the first device, thus allowing timing of response signals from the second device to act as an additional layer of security verifying that the devices are authorized to communicate with one another. If the second encrypted message is received by the first device within the first time window, the user-operated device will validate the second encrypted message by comparing its fixed code and changing or variable code to a set of stored code values. The first device may compare the time of receipt of the second encrypted message to the first time window, only proceeding to analyze signals which are received within the first time window. Alternatively, in order to conserve power the first device transceiver may turn on and enable a receiver of the first device to receive transmissions only within the first time window so that the second encrypted message will be entirely ignored if sent and received outside of the first time window. In some embodiments, the time window is less than about 360 milliseconds, and in some embodiments, begins tens or hundreds of milliseconds after the time window is determined by the first device. The time window is preferably short enough so that there is no noticeable delay to the user between actuating the transmitter device and causing the requested action.

Referring now to the drawings and especially to FIG. 1, a moveable barrier operator system 10 is provided that includes moveable barrier operator 12 mounted within a garage 14 and a handheld transceiver or control device 30. The operator 12 is mounted to the ceiling 16 of the garage 14 and includes a rail 18 extending therefrom with a releasable trolley 20 attached having an arm 22 extending to a multiple paneled garage door 24 positioned for movement along a pair of door tracks 26 and 28. The handheld transceiver unit 30 is adapted to send signals to and receive signals from the operator 12. An antenna 32 may be positioned on the operator 12 and coupled to a receiver as discussed hereinafter in order to receive transmissions from the handheld control device 30. An external control pad 34 may also be positioned on the outside of the garage 14 having a plurality of buttons thereon and communicate via radio frequency transmission with the antenna 32 of the operator 12. An optical emitter 42 may be connected via a power and signal line 44 to the operator 12 with an optical detector 46 connected via a wire 48 to the operator 12 in order to prevent closing of the door 24 on a person or object inadvertently in the door's path. An input such as a button or switch 300 may be provided for switching the operator between modes, such as operating mode and learn mode.

Figure 2:
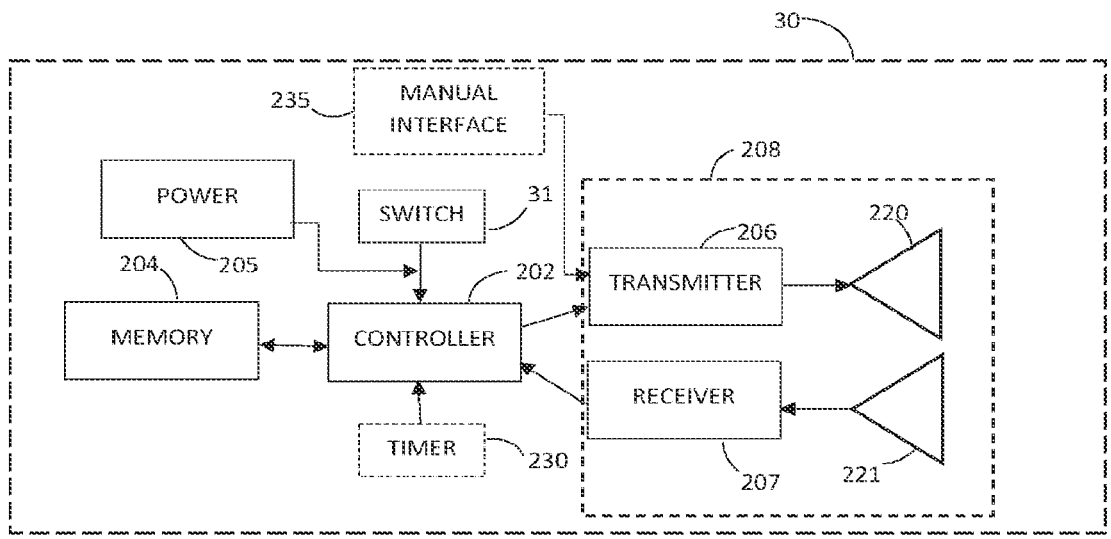
FIG. 2 is a block diagram of an example of the user-operated control device of FIG. 1.

Referring now to FIG. 2, a block diagram of the control device 30 is provided. The control device 30 includes a communication circuit 208 comprising both a transmitter 206 and receiver 207 (which may be combined into a single transceiver mechanism) in operative communication with antennas 220 and 221, respectively. The antennas may be positioned in, on, or extending from the user operated control device 30, wherein the transmitter 206 and receiver 207 are configured for wirelessly transmitting and receiving transmission signals to and from the moveable barrier operator 12, including transmission signals that contain a first rolling access code with a fixed code portion and a rolling code portion. In some embodiments, both the transmitter and receiver may communicate with a single antenna or multiple antennas, and in some embodiments the transmitter and receiver may be configured to be a single transceiver device in communication with a single antenna. The user-operated control device 30 also includes a controller 202 in operative communication with the transmitter 206 and a memory 204 and is configured for processing data and carrying out commands. The memory may be, for instance, a non-transitory computer readable medium, and may have stored thereon instructions that when executed by a controller circuit cause the controller circuit to perform operations. A power source 205 is coupled to the controller 202 and/or other components, and may be routed in some embodiments so that a user interface, such as switch 31, couples/decouples the power source to other components so that power is supplied only upon activation of the switch 31 or a specified time thereafter. The controller 202 is configured to generate and cause the transmitter 206 to transmit a first rolling access code, including at least one fixed code portion and at least one changing or rolling code portion for the transmission signal, and the receiver 207 is configured to receive responsive transmissions. Optionally, a timer 230 in communication with the controller 202 provides a way to determine the time of incoming and outgoing signal transmissions, and provides reference for the controller 202 to enable and disable the transmitter 206 and/or receiver 207 of the device. In some embodiments, a manual setting interface 235 may be provided, which in some forms may include one or more DIP switches or other devices configured to allow a user to configure a setting or state of the controller 202. The manual setting interface 235 may be operatively coupled to the transmitter in order to allow transmission of a payload conveying information regarding the current setting or state of the manual setting interface. The memory 204 is connected for operative communication with the controller 202 and is configured to store codes and in some embodiments other information for outgoing transmissions. The memory 204 is further configured to store fixed and/or changing or variable code information for comparison to incoming transmissions. The switch 31 may include one or more user-operable switches for inputting commands to the controller 30, for example to issue a barrier movement command or a learning command. The switch 31 may be associated with a button, lever, or other device to be actuated, for example by a user's hand or other actions, events, or conditions. As other examples, the switch 31 may be voice operated or operated by a user contacting a touch-sensitive screen as the location of an object displayed on the screen.

Figure 3:
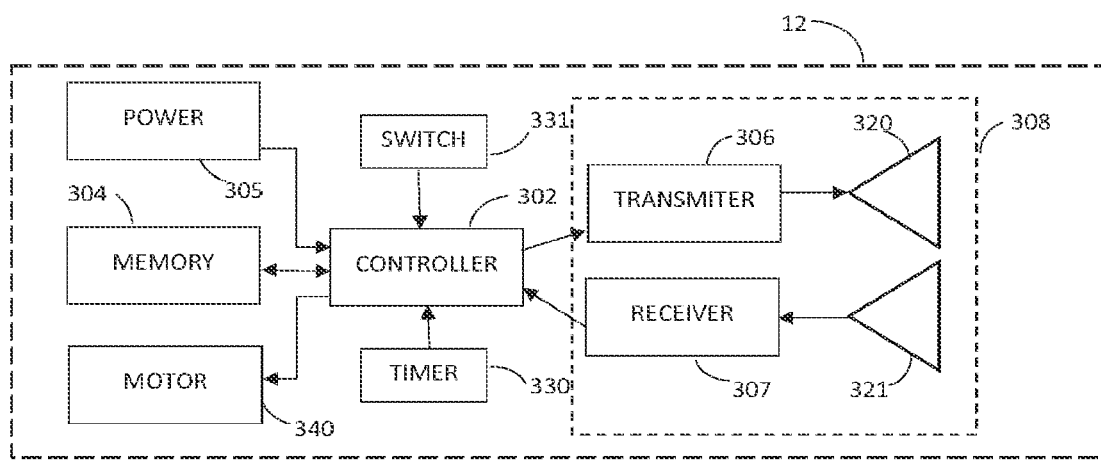
FIG. 3 is a block diagram of an example of the moveable barrier operator of the system of FIG. 1.

Referring now to FIG. 3, in one example, the operator 12 includes a controller 302 in communication with a memory 304 and is configured for storing and retrieving data to and from the memory 304 as well as processing data and carrying out commands. A power source 305, such as an AC power conduit, battery, or other known source, supplies electricity to the controller 302 in order to allow operation. As an example, the power source 305 may include an AC power conduit, a power conditioning circuit, a battery, and a battery charging circuit. The operator 12 also includes a communication circuit 308 comprising a wireless transmitter 306 and receiver 307 (or combination transceiver device) in operative communication with the controller 302. As shown, the transmitter 306 communicates with a first antenna 320 and the receiver communicates with a second antenna 321, but both devices may communicate with a single antenna or multiple antennas, and in some embodiments the device may be configured to have a single transceiver device in communication with a single antenna. The antennas may be positioned in, on, or extending from the moveable barrier operator 12. In this regard, signals, such as radio frequency or other wireless transmission carriers, may be sent to and received from the user-actuated control device 30 according to a variety of frequencies or modulations. Signals may be modulated in a number of different ways; thus, the control device 30 and moveable barrier operator 12 may be configured to communicate with one another via a variety of techniques. The controller 302 of the operator device 12 is also in communication with an actuator such as a motor 340 in order to carry out an operation such as lifting or lowering a garage door; sliding, swinging, or rotating a gate; or otherwise moving or repositioning a barrier structure. One or more switches 331 or buttons/keys constituting a user input may be provided to override the controller 302 or place the controller in and out of a learning mode in which the operator 12 may be paired with a user-operated device by exchanging and storing messages.

The term controller refers broadly to any microcontroller, application specific integrated circuit (ASIC), field programmable gate array (FPGA), computer, state machine, or processor-based device with processor, memory, and programmable input/output peripherals, which is generally designed to govern the operation of other components and devices. It is further understood to include common accompanying accessory devices. The controller can be implemented through one or more processors, microprocessors, central processing units, logic, local digital storage, firmware, software, and/or other control hardware and/or software, and may be used to execute or assist in executing the steps of the processes, methods, functionality, and techniques described herein. Furthermore, in some implementations the controller may provide multiprocessor functionality. These architectural options are well known and understood in the art and require no further description here. The controllers may be configured (for example, by using corresponding programming stored in a memory as will be well understood by those skilled in the art) to carry out one or more of the steps, actions, and/or functions described herein.

Generally, the controllers 202 and 302 may be configured similarly or independently, and each can include fixed-purpose hard-wired platforms or can comprise a partially or wholly programmable platform. These architectural options are well known and understood in the art and require no further description here. The controller can be configured (for example, by using corresponding programming as will be well understood by those skilled in the art) to carry out one or more of the steps, actions, and/or functions described herein, and can store instructions, code, and the like that is implemented by the controller and/or processors to implement intended functionality. In some applications, the controller and/or memory may be distributed over a communications network (e.g. LAN, WAN, Internet) providing distributed and/or redundant processing and functionality. In some implementations, the controller can comprise a processor and a memory module integrated together, such as in a microcontroller. One or more power sources may provide power to each controller, and may be of any known type.

When a user actuates the switch 31 of the user-operated control device 30, such as by pressing a button designated as performing a particular action, the controller 202 activates the transmitter 206 to transmit through antenna 220 a message based on information stored in the memory 204. The message is received by the receiver 307 of the operator device 12, and communicated to the operator's controller 302. In some embodiments, the controller 302 verifies the message by comparing the message to stored information from the operator's memory module 304, and upon verification the controller 302 is configured to cause transmission of a response signal from the transmitter 306 through antenna 320. If the message from the user-actuated control device 30 includes information relating to timing parameters for a response, the operator's controller 302 receives time information from a timer 330 in order to determine when to transmit the response in order to comply with timing parameters of the user-actuated control device 30.

The user-actuated control device 30 may be configured to verify that the response from the operator 12 complies with transmitted timing requirements in any number of ways. In some embodiments, the controller 202 may compare a time stamp or other timing information relating to the operator's response to the transmitted time parameter using timer 230. In some embodiments, receiver 207 is generally inactive, but switched on by controller 202 only for a short time period consistent with the transmitted timing parameter. For instance, controller 202 may switch on receiver 207 for a window of time matching a time window transmitted in an outgoing message through transmitter 206, and upon expiration of the time window according to timer 230, controller 202 switches receiver 207 off again. Timing information may be either relative, for instance a specified number of seconds, milliseconds, or nanoseconds after transmission of an outgoing signal or other event, or may be absolute such as standard date and time information for a specific time zone. A timing synchronization protocol may be provided in some forms in order to maintain precision of timing with other devices despite drift or other factors.

Upon receiving the response of the operator 12 through receiver 207 at an appropriate time consistent with the specified timing parameter, the user-actuated control device 30 may validate the response by comparing it to stored information in the memory 204. Upon validation of the response, the user-actuated device 30 may transmit another message through transmitter 206 to the operator 12. This third message is configured to cause the operator's controller 302 to effect performance of an action, particularly to activate the motor 340 in order to carry out a function associated with activation of the user-actuated device. The control device 30 may include multiple buttons, levers, switches, displays, microphone(s), speaker(s), or other inputs associated with different tasks to be carried out by the operator 12. As one example, the control device 30 has a plurality of mechanical buttons that each operate a respective switch 31. As another example, the control device 30 includes a display with one or more virtual buttons.

In another example, pairing of the moveable barrier operator 12 to a user-actuated control device 30 may be performed. The receiver 307 of the operator 12 is configured to receive an authorization signal indicating that the operator 12 is authorized to communicate with the control device 30 and to provide an indication that it received the authorization signal to the controller 302. One or more switches 331 may be provided in order to turn on and/or otherwise permit the receiver 307 to receive the authorization signal. In response to receiving the authorization signal, the controller 302 is configured to generate a first rolling access code and to store a representation of the first rolling access code in the memory device 304. The controller 302 is configured with the transmitter 306 to transmit a transmission signal including the first rolling access code to the user-actuated device 30. The receiver 307 also receives a transmission signal from the user-actuated control device 30 including a second rolling access code, as described further below. In this example, the receiver 307 provides the transmission signal to the controller 302, which compares the second rolling access code with the representation of the first rolling access code stored in the memory device 304.

Figure 4:
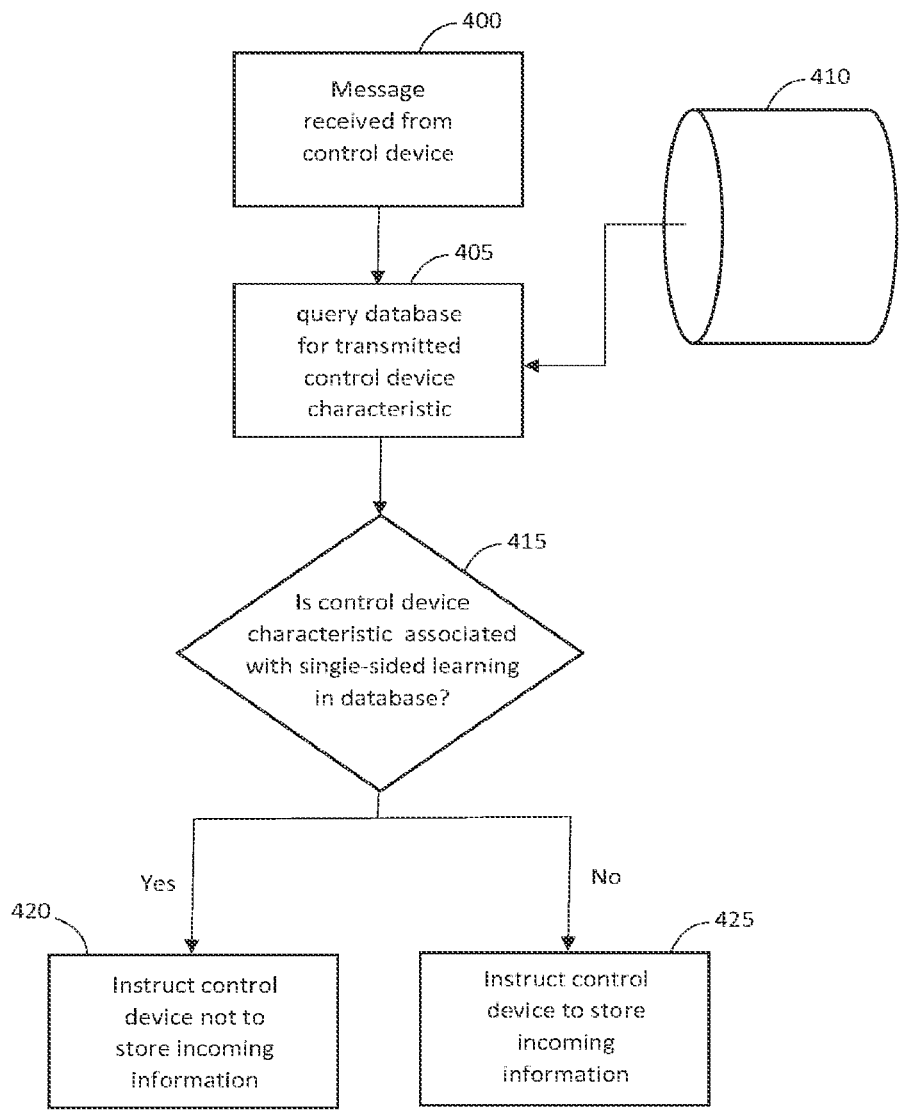
FIG. 4 is a flow diagram illustrating an example of a process for determining whether to instruct another device with a single-sided learning protocol or a dual-sided learning protocol.

In some embodiments, an operator and a control device are paired by each device learning information about the other device in order to validate subsequent communications. Some control devices, however, may default to, or only be capable of, a state that does not learn an operator. Therefore, an operator may be configured to determine if a control device is capable of learning the operator and alter communications with the control device accordingly. FIG. 4 is a flow chart that demonstrates one example of a decision-making process of an operator consistent with some embodiments of the present disclosure. In this example, an operator is set to a learning mode, for instance by pressing a button or moving a switch to a "learn" position. At step 400 a message is then received by the operator upon activation of a control device. At step 405, the operator then compares information from the received message to information from a database 410 (which may be stored in a memory of the operator, in the memory of a server device accessible by the operator, in a network storage accessible by the operator, in a cloud-based platform, or in any other location accessible by the operator), for example by receiving information regarding a device characteristic from the message and locating the characteristic in an index or lookup table to determine if the characteristic is associated with single sided learning (step 415). The characteristic of the control device may be, for instance, a fixed value or code transmitted by the device, a code or value associated with a current state of the device (for example a code or value transmitted when a DIP switch is set to a position that corresponds to single-sided communication), information derived from a transmitted message or the format of a transmitted message, or other information representative of some aspect of the control device. If the operator determines that the database 410 associates the control device characteristic received by the operator with single-sided learning process, the operator will instruct the control device to avoid storing one or more subsequent pieces of information transmitted from the operator to the control device (step 420) in order to turn off or bypass bidirectional validation of transmitted signals. On the other hand, if the operator determines that the database 410 does not associate the control device characteristic received by the operator with single-sided learning process, the operator will instruct the control device to store subsequent information transmitted from the operator to the control device (step 425). The instructions may be configured in any desired manner. For instance, an instruction not to store incoming information 420 may be an active transmission of information that causes the control device to ignore certain subsequently received information, or may alternatively be a withholding of certain instructions if the default state of the control device is to avoid storing information received from the operator. Likewise, an instruction to store incoming information 425 may be an active transmission of information that causes the control device to store certain subsequently received information, or may alternatively be a withholding of certain instructions if the default state of the control device is to avoid storing information received from the operator.

Figure 5A:
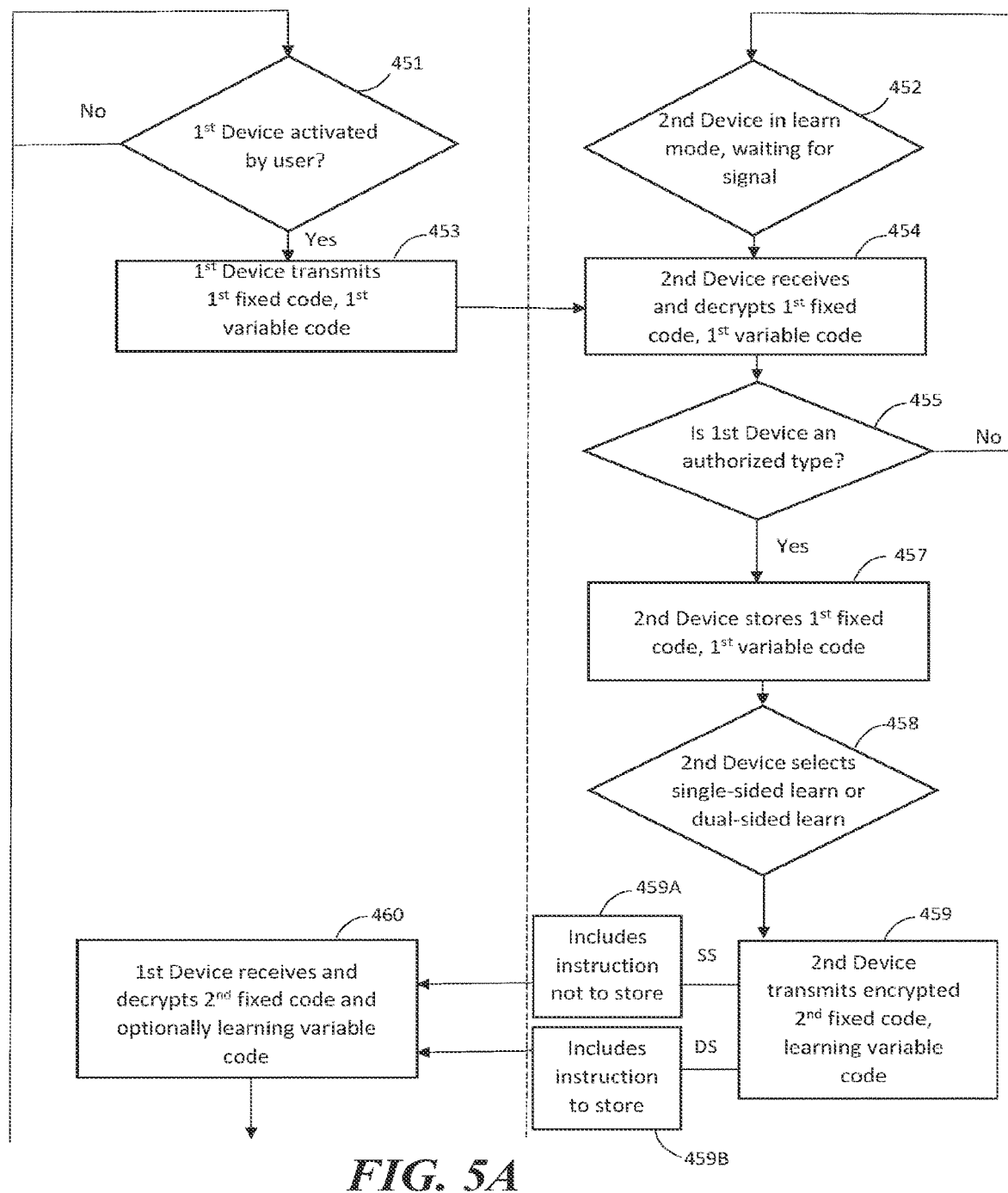
FIGS. 5A-C are interconnecting flow diagrams showing an example communication flow between a first device and a second device during a learning or pairing sequence.
Figure 5B:
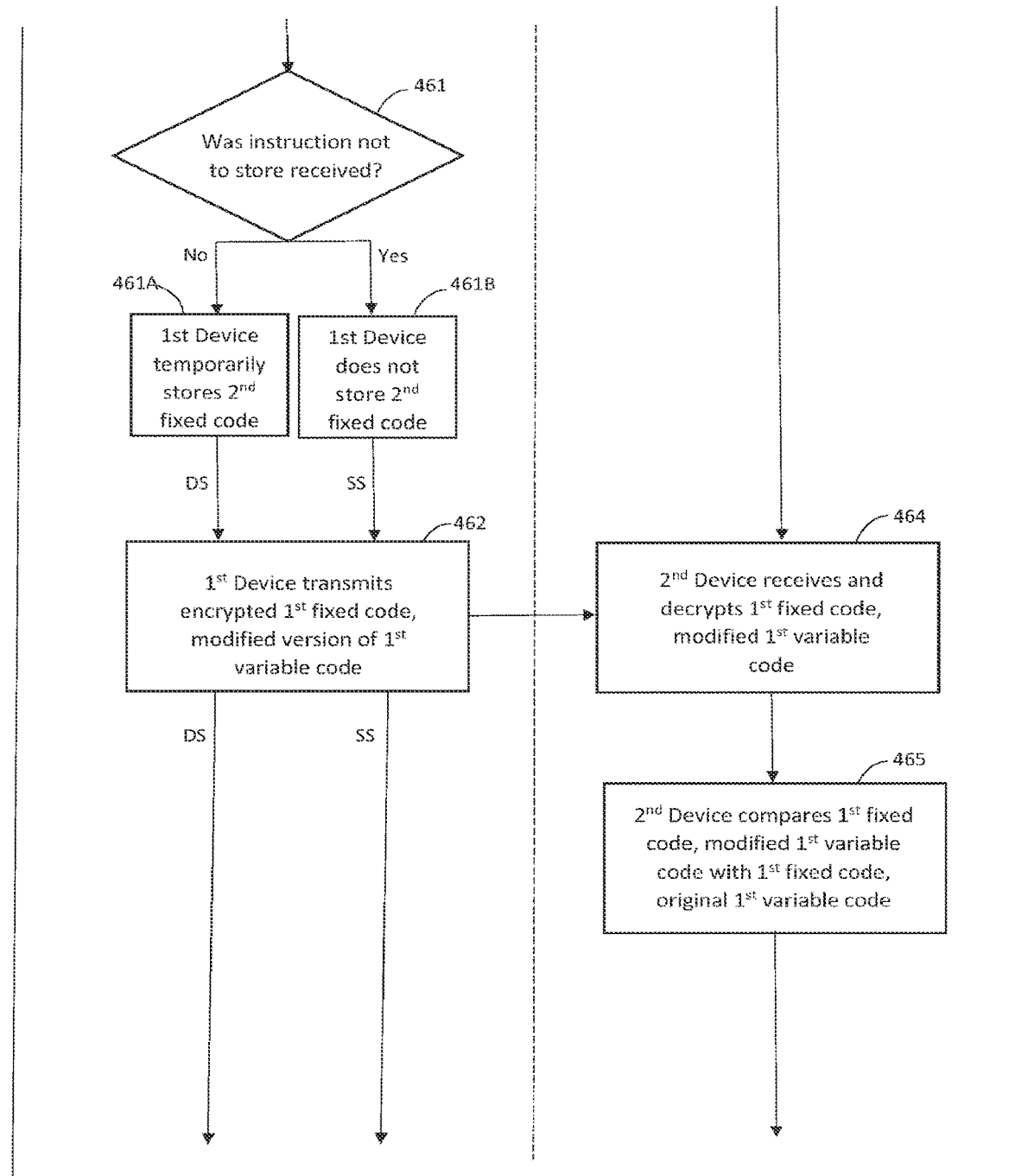
Figure 5C:
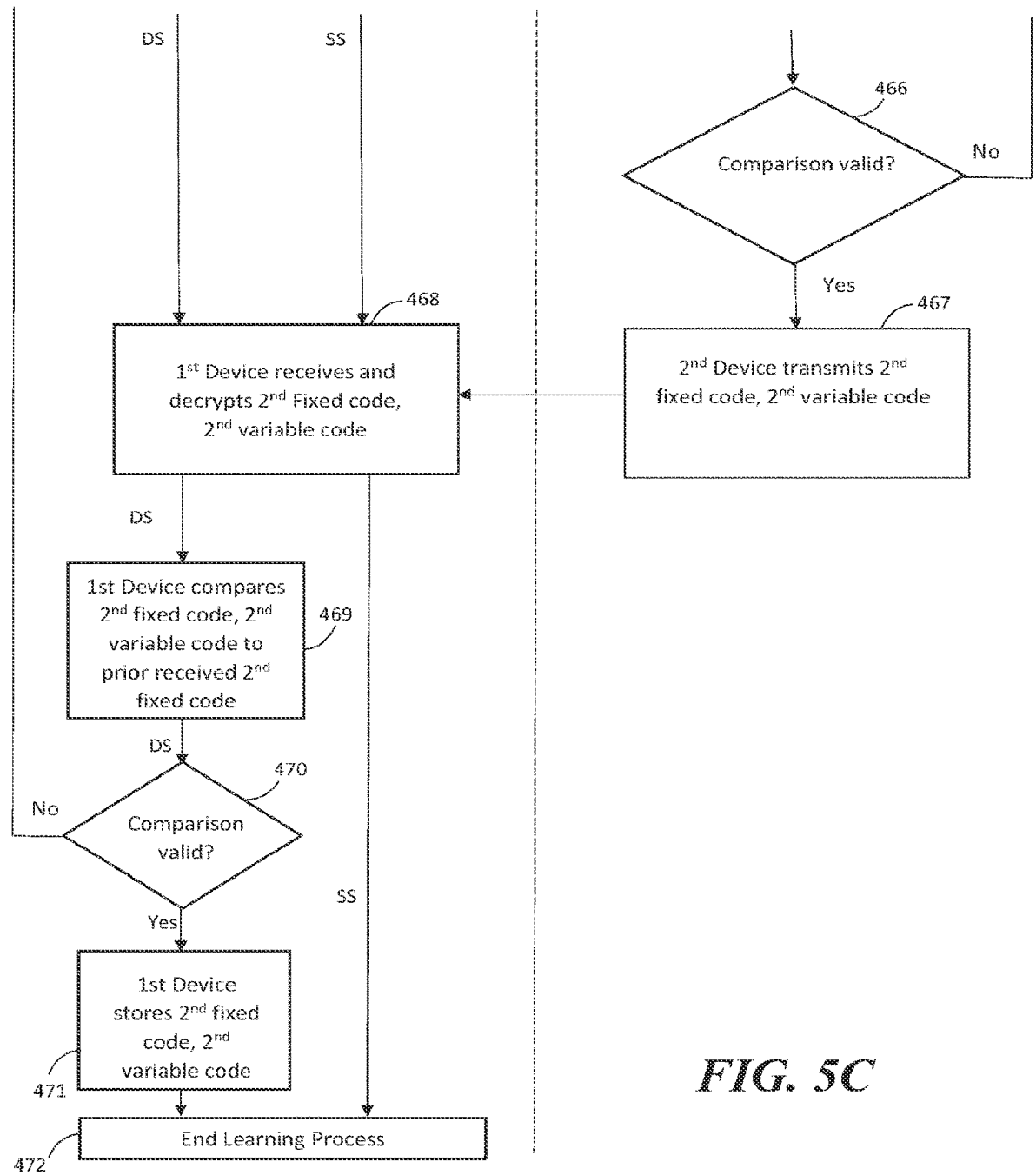

Turning now to FIGS. 5A-C, a flow diagram is provided that illustrates an example method of pairing a first device to a second device so that, for example, a first device is synchronized with a second device in order to recognize and validate signals so that the devices are paired. Steps to the left of the central dashed line relate to the first device, such as a user-operated control device, while steps to the right relate to the second device, such as a moveable barrier operator or a receiver that is associated with or integrated into a moveable barrier operator. For example, the first and second devices may be the control device 30 and the operator 12 discussed previously in connection with FIGS. 2 and 3. The method involves at least one of the devices learning a changing code sequence from the other device, and in some embodiments, may involve bidirectional learning so that each device receives and stores a series of fixed and changing code values from the other device. In the illustrated embodiment, the second device determines whether to initiate bidirectional (dual-sided) learning wherein both devices learn an encrypted changing code from the other device or unidirectional (single-sided) learning of devices wherein only one device learns an encrypted changing code of the other device. In some embodiments, the devices may be configured so that the method of pairing entails receiving a user input such as a button or other actuator being manipulated on one or both devices, such as pressing a button or activating a physical switch on a garage door operator to set that device set to a learning mode.

In one form, the pairing method begins when a first device is activated by a user (step 451) while a second device has been placed in "learn" mode (step 452), such as by pushing a button or otherwise instructing the second device. To begin, the first device contains within its memory a first fixed code and a first variable code, and the second device contains a second fixed code and a second variable code. When the first device is activated, it transmits (step 453) from the first device a first encrypted message that includes at least a first fixed code and a first changing or variable code, and that may also include other information such as a payload associated with a DIP switch of the first device. The second device receives and decrypts the first encrypted message (step 454) while in the learning mode and determines (step 455) if the first device is of an authorized type (validates that the first device is appropriate to learn). The second device may determine if the first device is authorized by, for instance, comparing information received from the first device (such as the first fixed code) to an authorized device whitelist, analyzing the format or other characteristics of the first encrypted message, proximity of the first device to the second device when learning mode is activated, or any other known method, relying on database (410) information stored in or available to the second device, available through a local or cloud-based network, or utilizing other sources of information. If the first device is not recognized as authorized, the pairing process terminates. On the other hand, if the second device determines that the first device is of an authorized type, the second device temporarily stores in the second device's memory the decrypted first fixed and first variable codes from the first encrypted message (or portions thereof) and optionally other transmitted information (step 457). The second device also determines whether to proceed with a single-sided learning protocol (where the second device learns the first device) or a dual-sided learn (where the second device learns the first device and the first device also learns the second device). The second device selects either a single-sided learning protocol or dual-sided learning protocol based on one or more factors from the transmission received from the first device (step 458), for instance based on the first fixed code or a portion thereof. The second device then encrypts and transmits 459 a response to the first device, the response comprising a second encrypted message including a second fixed code from the second device. The second encrypted message also includes a learning variable code that signals to the first device that the second device is learning the first device, and may further include other optional information. If the single-sided learn path (SS) has been selected by the second device, the transmission includes an instruction not to store information associated with the second fixed code or other portions of the second encrypted message (459A). If the dual-sided learn path (DS) has been selected, the transmission from the second device includes an instruction to store information associated with the second fixed code or other portions of the second encrypted message (459B). In both the single-sided learn path (SS) and dual-sided learn path (DS) the first device receives and decrypts the second fixed code (step 460). Optionally, the first device may require, specify or request that the second encrypted message is received within a specified time window of the transmission of the first encrypted message in order to be validated and decrypted by the first device. In addition, or alternatively, the first device may be configured to validate the second encrypted message in one or more other ways.

The first device then determines whether an instruction not to store information from the second encrypted message has been received (step 461), and if so the first device does not store the second fixed code in its memory (step 461B). If the first device determines (step 461) that an instruction not to store information has not been received from the second device, the first device consequently proceeds to temporarily store the second fixed code (step 461A). In either case, the first device encrypts and transmits a third encrypted message (step 462) comprising the first fixed code and a modified version of the first variable code, and in some cases additional information. In some forms, the first device may be configured to inspect the learning variable code received from the second device in step 459 to determine if the second device is learning the first device, and in some forms will only transmit the third encrypted message in step 462 if the first device confirms that the second device is learning the first device. In some cases additional information is transmitted in step 462, such as, for instance, a payload associated with a DIP switch of the first device indicating a state, mode, or type of the first device.

When the second device receives and decrypts (step 464) the third encrypted message, the second device validates the message by comparing the first fixed code and the changed versions of the first variable code to stored code values related to the first encrypted message (step 465). The second device also stores the first fixed code, modified version of the first variable code, and optionally other information such as a payload from the third encrypted message, such storing (not shown, after step 265) thereby establishing the first device as a learned device. The second device will also generate an initial second variable code. If the second device determines that the comparison is valid (step 466), the second device then transmits (step 467) in response to validating the third encrypted message a fourth encrypted message including the second fixed code and a second variable code from the memory of the second device.

The first device receives and decrypts (step 468) the fourth encrypted message and, if in a dual-sided (DS) learn protocol, validates the fourth message by comparing (step 469) the second fixed code and the second changing code to information relating to the response stored by the first device. If the fourth message is determined to be valid (step 470), the first device stores the second fixed code and the second changed version of the second variable code (step 471) to establish the second device as a learned device in response to validating the fourth encrypted message prior to ending the learning process (step 472). Otherwise if the fourth message is determined (step 470) to be invalid, the learning process is terminated prior to storing the second fixed code and second variable code. In the single-sided (SS) learn protocol, the first device proceeds directly to the end of the learning process (step 472) without storing the second fixed code and second variable code (i.e. bypassing steps 469, 470 and 471).

The variable or changing codes transmitted by the first and second devices may be selected from those known in the art, such as rolling code systems in which the changing code is modified based on a preset algorithm and/or a predefined list or sequence of numbers. When a device validates a changing code by comparison with stored values, the device will ordinarily compare the received code value to a plurality of expected subsequent values in order to account for activations of one device that are out of range of the other device or otherwise do not result in communication with the other device. For instance, in some embodiments a device will compare a received changing code to at least twelve stored values, and in some embodiments at least 24, 48, 96, 128, or 256 stored values.

A variety of methods and/or algorithms may be used to encrypt and/or decrypt the fixed and changing codes of each message transmitted between devices. In some forms, a first device transmits an encrypted signal by generating a radio frequency oscillatory signal, generating variable binary code, generating a three-valued/trinary code responsive to the variable binary code, and modulating the radio frequency oscillatory signal with the trinary code to produce a modulated trinary coded variable radio frequency signal for operation or control of a second device. To provide even further security, in some embodiments the fixed code and the rolling codes may be shuffled or interleaved so that alternating trinary bits are comprised of a fixed code bit and a rolling code bit to yield, for example, a total of 40 trinary bits. The 40 trinary bits may then be packaged in a first 20-trinary bit frame and a second 20-trinary bit frame. A single synchronization and/or identification pulse may proceed the first and second frames to indicate the start of the frame and whether it is the first frame or the second frame. Signals may be configured to comply with local laws and regulations; for instance, immediately following each of the frames, the first device may be placed into a quieting condition to maintain the average power of the transmitter over a typical 100 millisecond interval and within local regulations (e.g. within legal limits promulgated by the United States Federal Communications Commission). The first trinary frame and the second trinary frame may be used to modulate a radio frequency carrier, for instance via amplitude modulation, to produce an amplitude modulated encrypted signal. The amplitude modulated encrypted signal may then be transmitted and may be received by the second device.

In some embodiments, the second device receives the amplitude modulated encrypted signal and demodulates the signal to produce a pair of trinary bit encoded frames. The trinary bits in each of the frames may be converted substantially in real-time to 2-bit or half nibbles indicative of the values of the trinary bits which ultimately may be used to form two 16-bit fixed code words and two 16-bit variable code words. The two 16-bit fixed code words may be used as a pointer to identify the location of a previously stored variable code value within the operator. The two 16-bit rolling code words may be concatenated by taking the 16-bit words having the more significant bits, multiplying it by 3 and then adding the result to the second of the words to produce a 32-bit encrypted variable code. The 32-bit encrypted code may then be compared via a binary subtraction with the stored variable code. If the 32-bit code is within a window or fixed count, the microprocessor of the second device may produce an authorization signal which may then be responded to by other portions of the second device's circuit to cause the garage door to open or close as commanded. In the event that the code is greater than the stored rolling code, plus the fixed count, indicative of a relatively large number of incrementations, a user may be allowed to provide further signals or indicia to the receiver to establish authorization, instead of being locked out, without any significant degradation of the security. This process may be accomplished by the receiver entering an alternate mode using two or more successive valid codes to be received, rather than just one. If the two or more successive valid codes are received in this example, the operator will be actuated and the garage door will open. However, in such an embodiment, to prevent a person who has previously or recently recorded a recent valid code from being able to obtain access to the garage, a trailing window is compared to the received code. If the received code is within this trailing window, the response of the system simply is to take no further action, nor to provide authorization during that code cycle due to indications that the code has been purloined.

Figure 6:
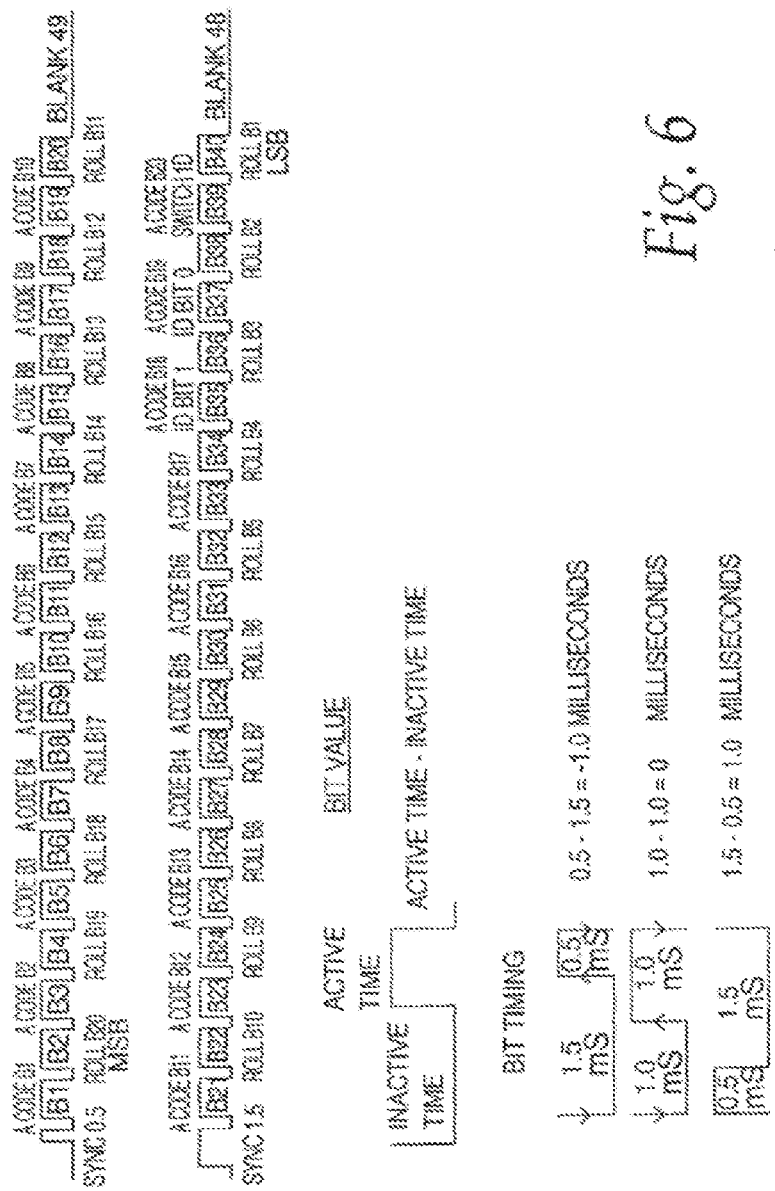
FIG. 6 is a timing diagram of examples of signals generated by a portion of a transmitter of one of the first and second devices.

FIGS. 6-8H demonstrate one potential encryption/decryption scheme. FIG. 6 is an example of trinary code which is used to modify the radio frequency oscillator signal. In the depicted example, the bit timing for a 0 is 1.5 milliseconds down time and 0.5 millisecond up time, for a 1, 1 millisecond down and 1 millisecond up, and for a 2, 0.5 millisecond down and 1.5 millisecond up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

Figure 7A:
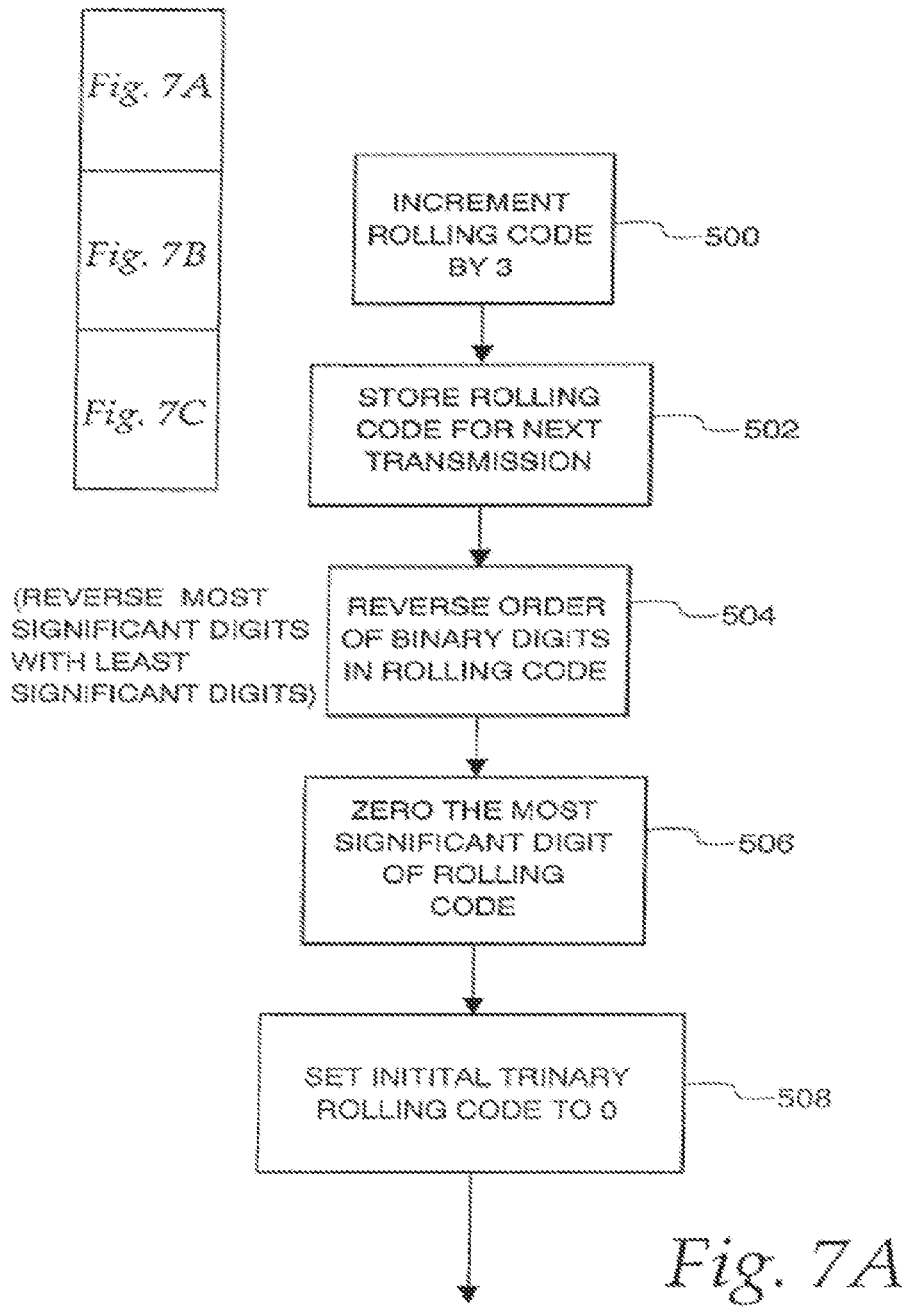
FIGS. 7A-C are flow diagrams showing examples of operation of the transmitter.
Figure 7B:
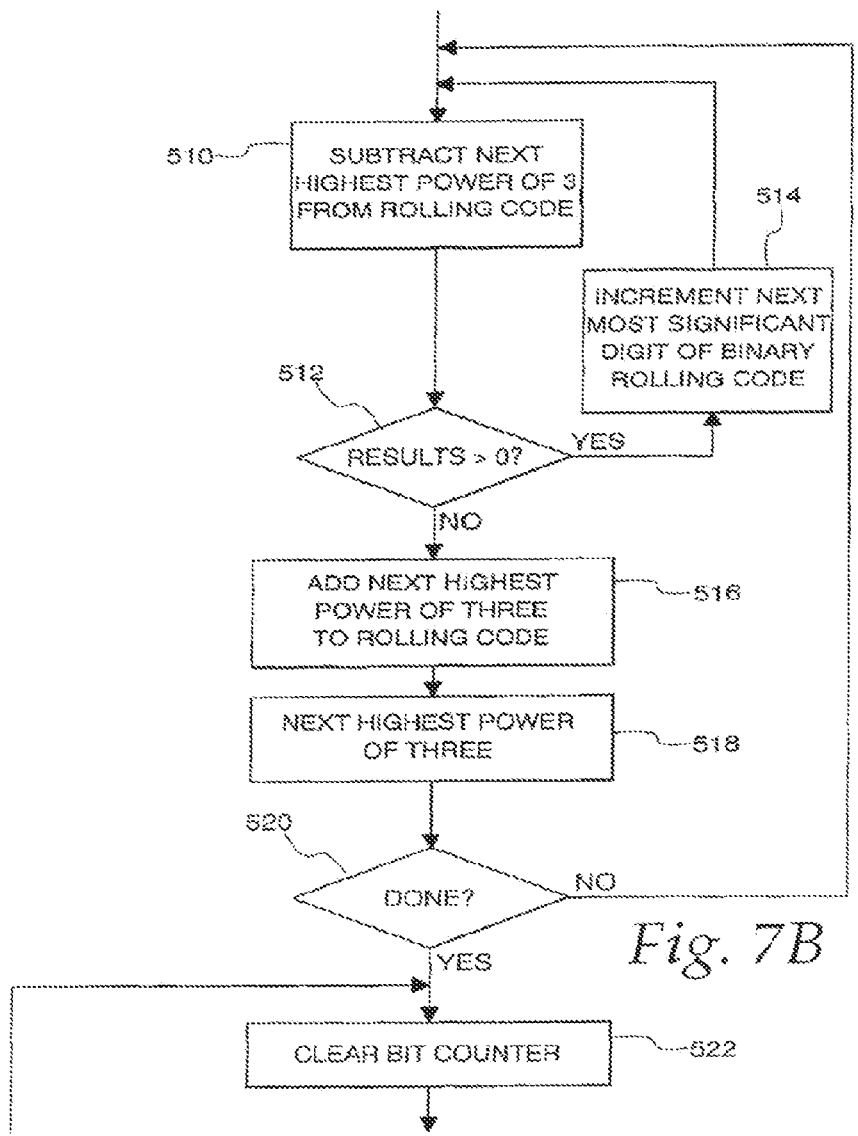
Figure 7C:
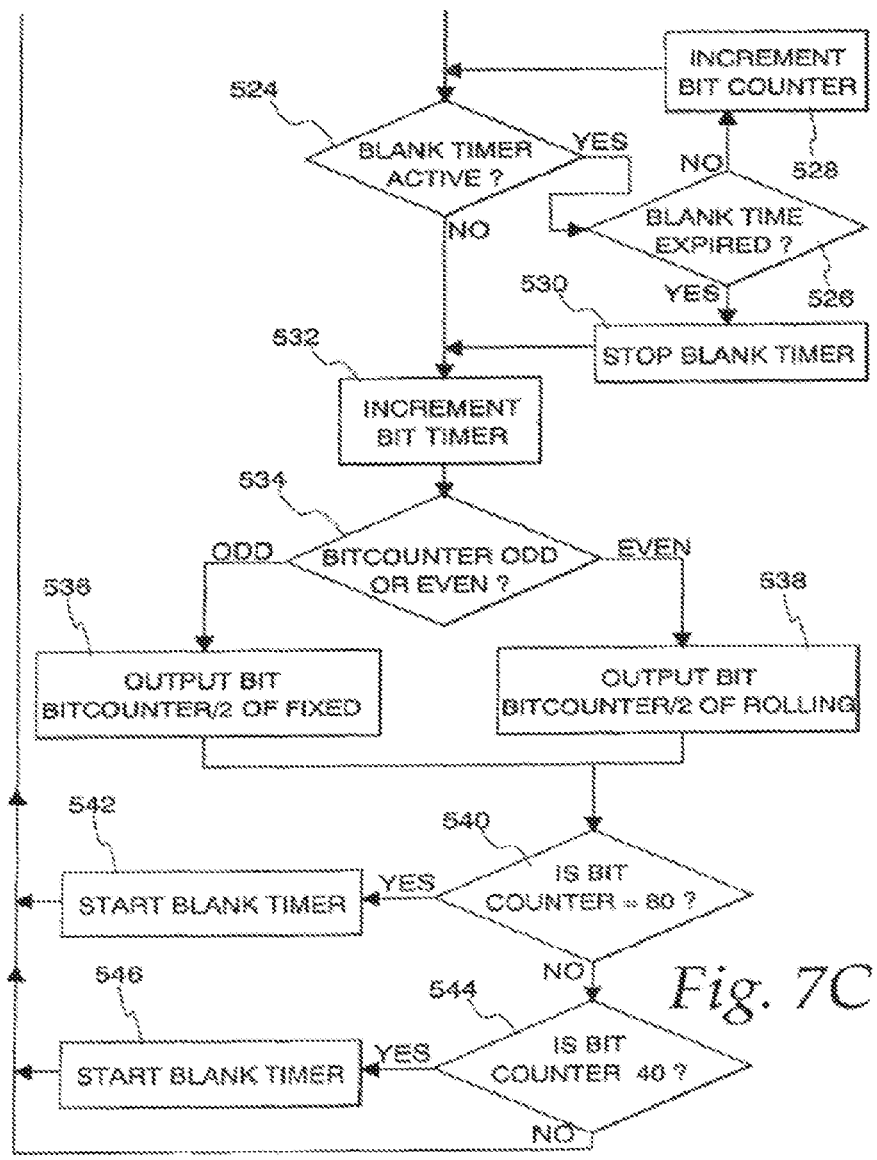

Referring now to FIGS. 7A through 7C, the flow chart set forth therein describes one form of generating a rolling code encrypted message from a first device to be transmitted to a second device. A rolling code is incremented by three in a step 500, followed by the rolling code being stored 502 for the next transmission from the device when a button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code bit is set to 0 in step 508. In some forms, the trinary code is actually used to modify the radio frequency oscillator signal, and an example of trinary code is shown in FIG. 6. It may be noted that the bit timing in FIG. 6 for a 0 is 1.5 milliseconds down time and 0.5 millisecond up time for a 1, 1 millisecond down and 1 millisecond up, and for a 2, 0.5 millisecond down and 1.5 milliseconds up. The up time is actually the active time when carrier is being generated or transmitted. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is greater than zero. If it is, the next most significant digit of the binary rolling code is incremented in a step 514, following which the method returns to the step 510. If the result is not greater than 0, the next highest power of 3 is added to the rolling code in step 516. In step 518, another highest power of 3 is incremented and in a step 518, another highest power of 3 is incremented and in a step 520, a test is determined as to whether the rolling code is completed. If not, control is transferred back to step 510. If the rolling code is complete, step 522 clears the bit counter. In a step 524, a blank timer is tested to determine whether it is active or not. If not, the bit counter is incremented in step 532. However, if the blank timer is active, a test is made in step 526 to determine whether the blank timer has expired. If the blank timer has not expired, control is transferred to a step 528 in which the bit counter is incremented, following which control is transferred back to the decision step 524. If the blank timer has expired as measured in decision step 526, the blank timer is stopped in a step 530 and the bit counter is incremented in a step 532. The bit counter is then tested for odd or even in a step 534. If the bit counter is not even, control is transferred to a step 536 where the output bit of the bit counter divided by 2 is fixed. If the bit counter is even, the output bit counter divided by 2 is rolling in a step 538. The bit counter is tested to determine whether it is set to equal to 80 in a step 540—if yes, the blank timer is started in a step 542, but if not, the bit counter is tested for whether it is equal to 40 in a step 544. If it is, the blank timer is tested and is started in a step 546. If the bit counter is not equal to 40, control is transferred back to step 522.

Figure 8A:
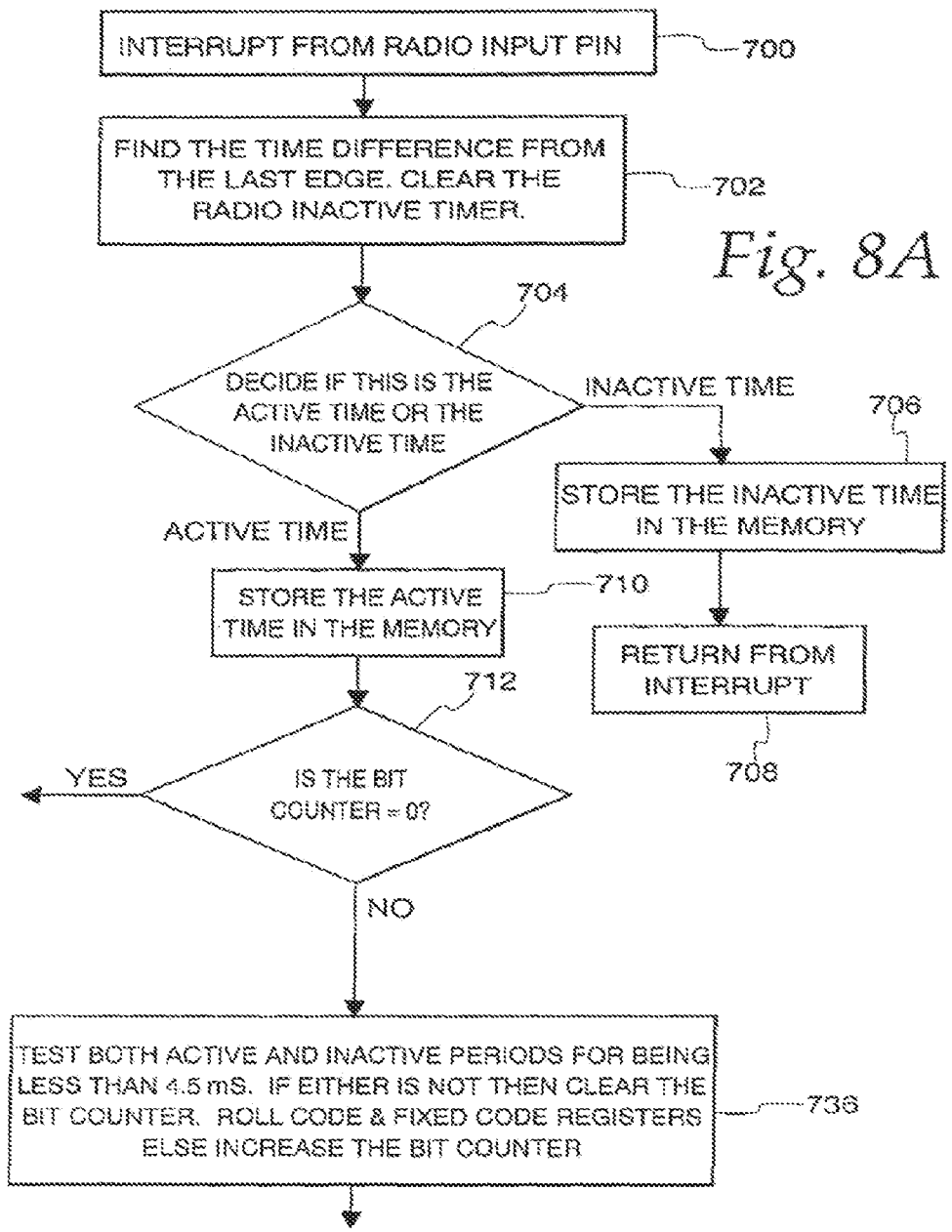
Figure 8B:
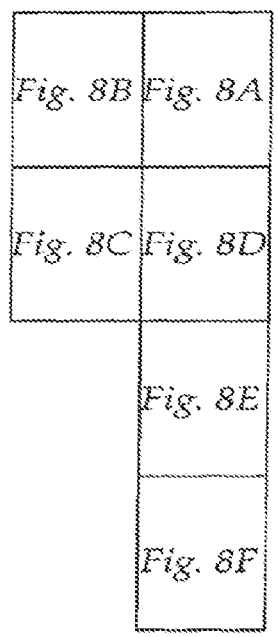
Figure 8B:
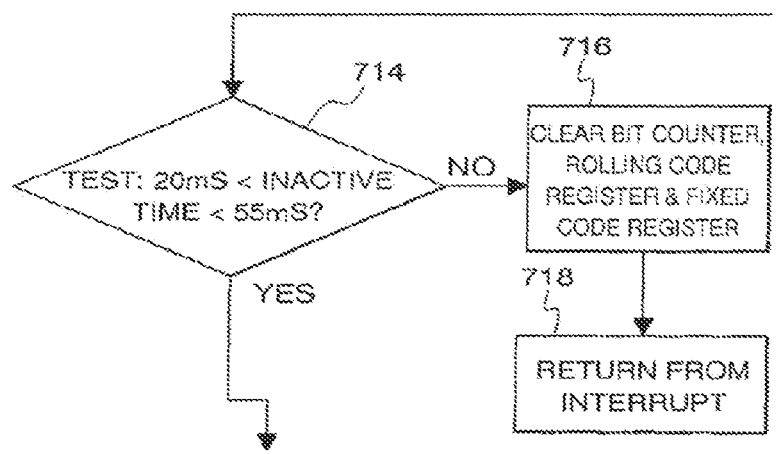
Figure 8C:
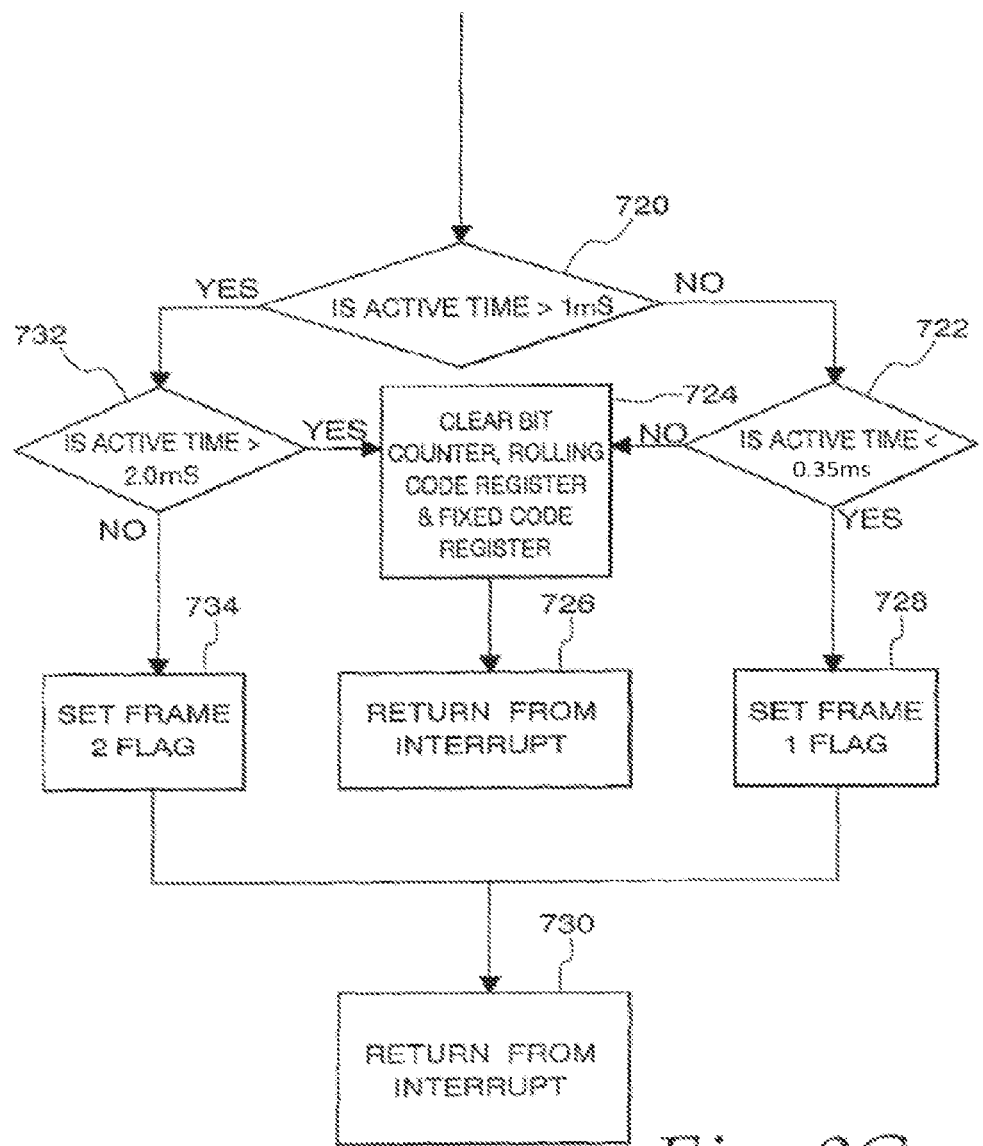

Referring now to FIGS. 8A through 8F and, in particular, to FIG. 8A, one example of processing of an encrypted message by a second device from a first device is set forth therein. In a step 700, an interrupt is detected and acted upon. The time difference between the last edge is determined and the radio inactive timer is cleared in step 702. A determination is made as to whether this is an active time or inactive time in a step 704, i.e., whether the signal is being sent with carrier or not. If it is an inactive time, indicating the absence of carrier, control is transferred to a step 706 to store the inactive time in the memory and the routine is exited in a step 708. In the event that it is an active time, the active time is stored in memory in a step 710 and the bit counter is tested in a step 712. If the bit counter is zero, control is transferred to a step 714, as may best be seen in FIG. 8B and a test is made to determine whether the inactive time is between 20 milliseconds and 55 milliseconds. If it is not, the bit counter is cleared as well as the rolling code register and the fixed code register in step 716 and the routine is exited in step 718.

In the event that the inactive time is between 20 milliseconds and 55 milliseconds, a test is made in a step 720 to determine whether the active time is greater than 1 millisecond, as shown in FIC. 8C. If it is not, a test is made in a step 722 to determine whether the inactive time is less than 0.35 millisecond. If it is, a frame 1 flag is set in a step 728 identifying the incoming information as being associated with frame 1 and the interrupt routine is exited in a step 730. In the event that the active time test in step 722 is not less than 0.35 millisecond, in the step 724, the bit counter is cleared as well as the rolling code register and the fixed register, and the return is exited in the step 726. If the active time is greater than 1 millisecond as tested in step 720, a test is made in a step 732 to determine whether the active time is greater than 2.0 milliseconds, and if not the frame 2 flag is set in a step 734 and the routine is exited in step 730. If the active time is greater than 2 milliseconds, the bit counter rolling code register and fixed code register are cleared in step 724 and the routine is exited in step 726.

Figure 8D:
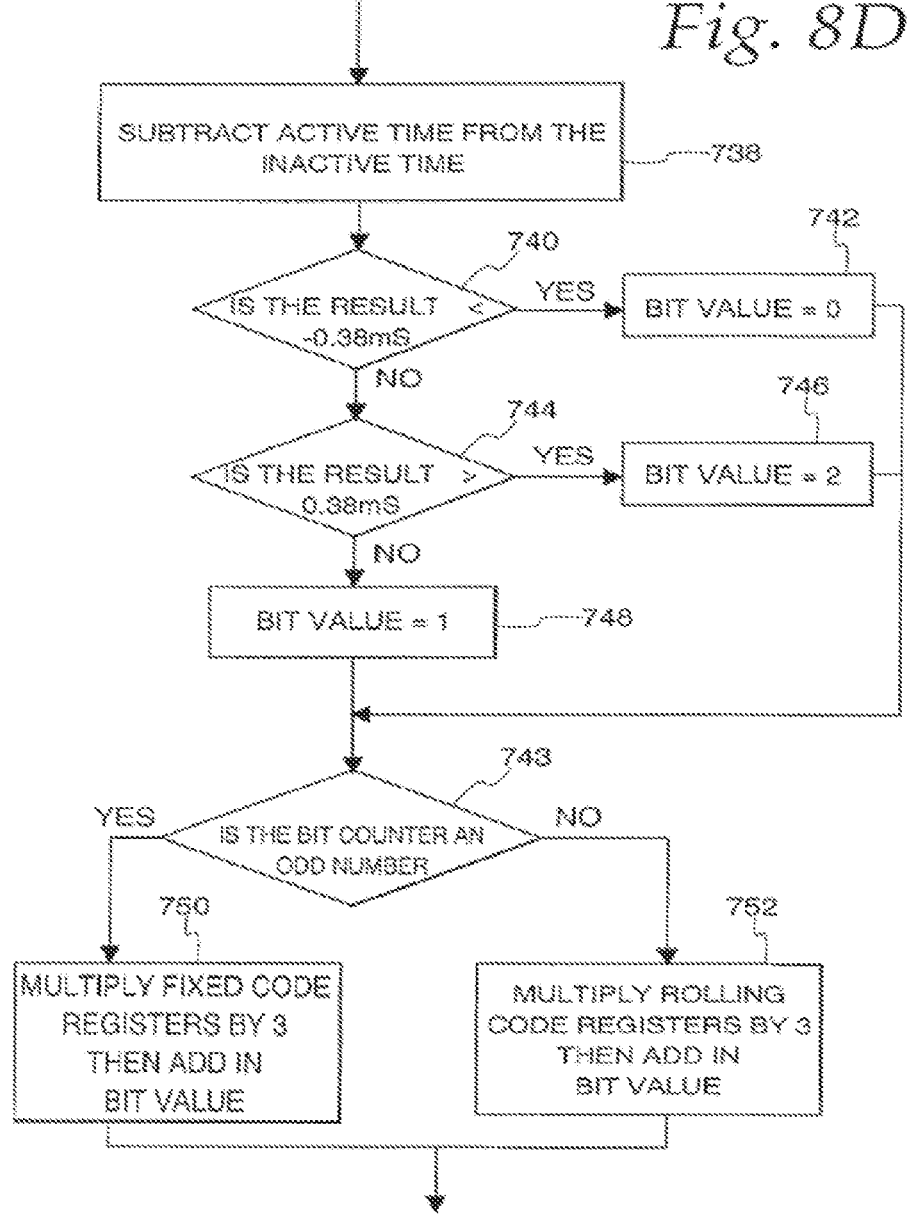

In the event that the bit counter test in step 712 indicates that the bit counter is not 0, control is transferred to setup 736, as shown in FIG. 8A. Both the active and inactive periods are tested to determine whether they are less than 4.5 milliseconds. If either period is not less than 4.5 milliseconds, the bit counter is cleared as well as the rolling code register and the fixed code registers. If both are equal to or greater than 4.5 milliseconds, the bit counter is incremented and the active time is subtracted from the inactive time in the step 738, as shown in FIG. 8D. In the step 740, the results of the subtraction are determined as to whether they are less than 0.38 milliseconds. If they are the bit value is set equal to zero in step 742 and control is transferred to a decision step 743. If the results are not less than 0.38 milliseconds, a test is made in a step 744 to determine if the difference between the active time and inactive time is greater than 0.38 milliseconds and control is then transferred to a step 746 setting the bit value equal to 2. Both of the bit values being set in steps 742 and 746 relate to a translation from the three-level trinary bits 0, 1 and 2 to a binary number.

If the result of the step 744 is in the negative, the bit value is set equal to 1 in step 748. Control is then transferred to the step 743 to test whether the bit counter is set to an odd or an even number. If it is set to an odd number, control is transferred to a step 750 where the fixed code, indicative of the fact that the bit is an odd numbered bit in the frame sequence, rather an even number bit, which would imply that it is one of the interleaved rolling code bits, is multiplied by three and then the bit value added in.

Figure 8F:
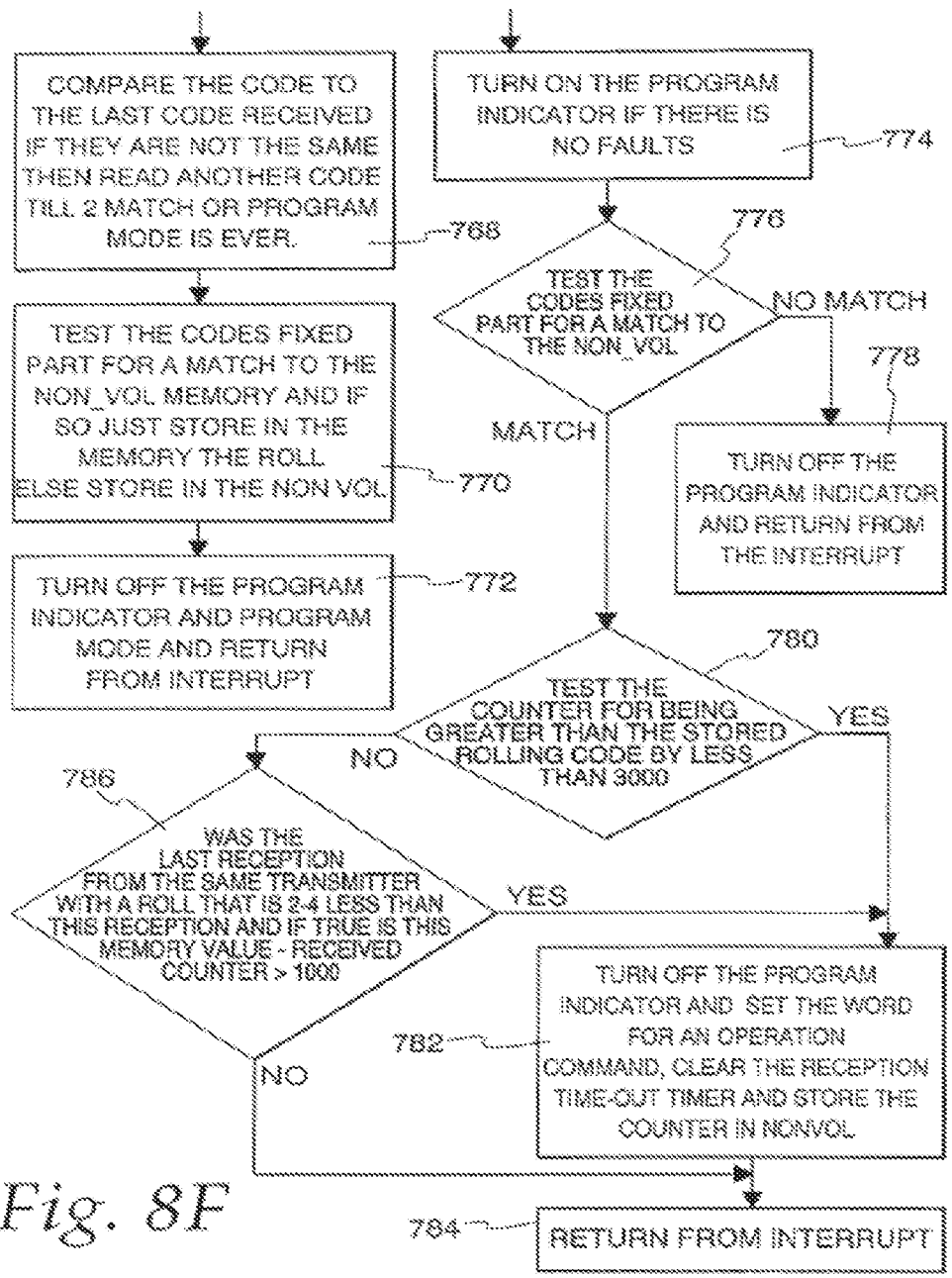

If the bit counter indicates that an odd number trinary bit is being processed, the existing rolling code registers are multiplied by three and then the trinary bit value obtained from steps 742, 746 and 748 is added in. Whether step 750 or 752 occurs, the bit counter value is then tested in the step 754, as shown in FIG. 8E. If the bit counter value is greater than 21, the bit counter rolling code register and fixed code register are cleared in the step 758 and the routine is exited. If the bit counter value is less than 21, there is a return from the interrupt sequence in a step 756. If the bit counter value is equal to 21, indicating that a sink bit plus trinary data bits have been received, a test is made in a step 760 to determine whether the sink bit was indicative of a first or second frame, if it was indicative of a first frame, the bit counter is cleared and set up is done for the second frame following which there is a return from the routine in the step 762. In the event that the second frame is indicated as being received by the decision of step 760, the two frames have their rolling contributions added together to form the complete inverted rolling code. The rolling code is then inverted or mirrored to recover the rolling code counter value in the step 764. A test is made in the step 766 to determine whether the program mode has been set. If it has been set, control is transferred to a step 768 where the code is compared to the last code received. If there is no match, then another code will be read until two successive codes match or the program mode is terminated. In a step 770, the codes are tested such that the fixed codes are tested for a match with a fixed code non-volatile memory. If there is a match, the rolling portion is stored in the memory. If there is not, the rolling portion is stored in the non-volatile memory. Control is then transferred to step 772, the program indicator is switched off, the program mode is exited and there is a return from the interrupt. In the event that the test of step 766 indicates that the program mode has not been set, the program indicator is switched on in a step 774, as shown in FIG. 8F. The codes are tested to determine whether there is a match for the fixed portion of the code in the step 776. If there is no match, the program indicator is switched off and the routine is exited in step 778. If there is a match, the counter which is indicative of the rolling code is tested to determine whether its value is greater than the stored rolling code by a factor or difference of less than 3,000 indicating an interval of 1,000 button pushes for the first device. If it is not, a test is made in the step 786 to determine whether the last transmission from the same first device is with a rolling code that is two to four less than the reception and, if true, is the memory value minus the received rolling code counter value greater than 1,000. If it is, control is transferred to a step 782 switching off the program indicator and setting the operation command word causing a commanded signal to operate the garage door operator. The reception time out timer is cleared and the counter value for the rolling code is stored in non-volatile memory, following which the routine is exited in the step 784. In the event that the difference is not greater than 1,000, in step 786 there is an immediate return from the interrupt in the step 784. In the event that the counter test in the step 780 is positive, steps 782 and 784 are then executed thereafter.

Figure 8G:
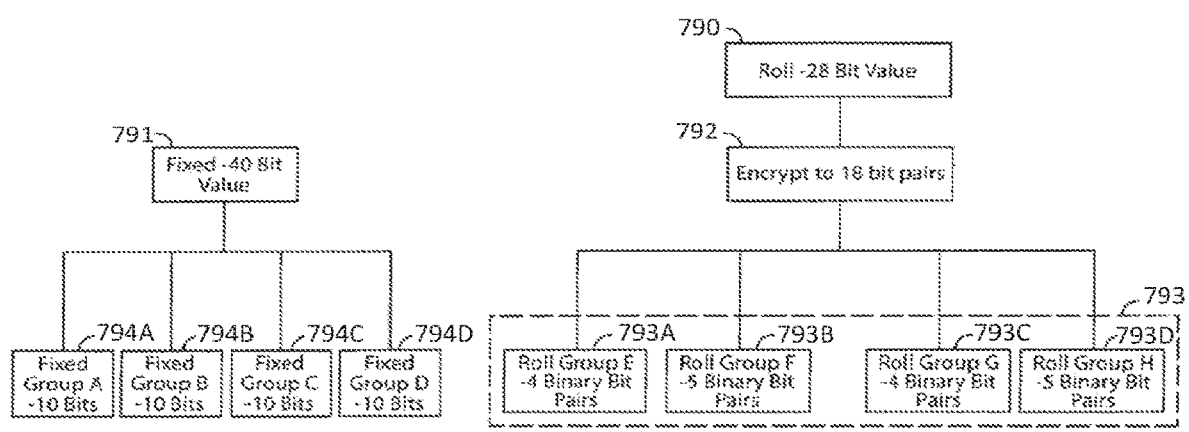
FIG. 8G is a schematic view of one example of bit processing for use in encrypting a message.

FIGS. 8G and 8H are schematic views of bit processing and parsing (FIG. 8G) and an example message diagram (FIG. 8H) configured in accordance with one example of forming an encrypted message. This provides one example in which a fixed code portion and variable (e.g. rolling) code portion may be used to form an encrypted message. Referring now to FIG. 8G, one illustrative embodiment of bit processing and parsing will be presented. In this example, the substantive content to be associated and transmitted with a 28 bit rolling code 790 comprises a 40 bit value that represents fixed information 791. This fixed information 791 may serve, for example, to uniquely identify the transmitter that will ultimately transmit this information. In this embodiment, the bits comprising the rolling code 790 are encrypted 792 by mirroring the bits and then translating those mirrored bits into ternary values as suggested above to provide corresponding bit pairs (in this example, this would comprise 18 such bit pairs) to thereby provide a resultant encrypted rolling code 793. This mirroring can be applied to specific groupings of bits in the rolling code creating mirrored groups or can involve the entire value. In this illustrative example, the encrypted rolling code 793 is presented for further processing as four groups. In this example, these four groups comprise a roll group E 793A comprised of four binary bit pairs, a roll group F 793B comprised of five binary bit pairs, a roll group G 793C comprised of four binary bit pairs, and a roll group H 793D comprised of five binary bit pairs.

The 40 bit fixed information 791 is subdivided in a similar manner albeit, in this embodiment, without encryption. This comprises, in this particular illustrative approach, forming four subgroups comprising a fixed group A 794A, a fixed group B 794B, a fixed group C 794C, and a fixed group D 794D, wherein each such group is comprised of 10 bits of the original 40 bit value.

These variously partitioned data groups can then be used as shown in FIG. 8H to effect a desired transmission. In this example, one or more joint messages 795 provide a primary vehicle by which to communicate the desired information (which includes both the encrypted rolling code and fixed information data as modified as a function of a given portion of the encrypted rolling code along with a recovery identifier that represents that given portion of the encrypted rolling code). This joint message 795 comprises, generally speaking, a first 20 bit portion 796 and a second 30 bit portion 797.

The first portion 796 comprises, in this embodiment, the following fields: "0000"—these bits 796A serve to precharge the decoding process and effectively establish an operational threshold; "1111"—these bits 796B comprise two bit pairs that present the illegal state "11" ("illegal" because this corresponds to a fourth unassigned state in the ternary context of these communications) and serve here as a basis for facilitating synchronization with a receiving platform; "00"—this bit pair 796C identifies a type of payload being borne by the joint message (in this embodiment, "00" corresponds to no payload other than the fixed identifying information for the transmitter itself, "01" corresponds to a supplemental data payload, and "10" corresponds to a supplemental data-only payload); "Xx"—this bit pair 796D presents a frame identifier that can be used by a receiver to determine whether all required joint messages 795 have been received and which can also be used to facilitate proper reconstruction of the transmitted data; "B3, B2, B1, B0"—these two bit pairs 796E comprise an inversion pattern recovery identifier and are selected from the bits that comprise the encrypted rolling code 793 described above; "B7, B6, B5, B4"—these two bit pairs 796F comprise a bit order pattern recovery identifier and are also selected from the bits that comprise the encrypted rolling code 793 described above.

There are various ways by which these recover identifier values can be selected. By one approach, a specified number of bits from the encrypted roll group can be selected to form a corresponding roll sub-group. These might comprise, for example, the first or the last eight bits of the encrypted roll group (in a forward or reversed order). These might also comprise, for example, any eight consecutive bits beginning with any pre-selected bit position. Other possibilities also exist. For example, only even position bits or odd position bits could serve in this regard. It would also be possible, for example, to use preselected bits as comprise one or more of the previously described roll group sub-groups.

It would also be possible to vary the selection mechanism from, for example, joint message to joint message. By one simple approach in this regard, for example, the first eight bits of the encrypted roll group 793 could be used to form the roll sub-group with the last eight bits of the encrypted roll group 793 being used in a similar fashion in an alternating manner. The bits that comprise this roll sub-group may then be further parsed to form two recovery indicators. These recovery indicators may be used in conjunction with one or more lookup tables to determine a data bit order pattern to use with respect to formatting the data as comprises a portion of the joint message. In some embodiments, roll groups used to form the recovery indicators do not appear in the joint message.

Figure 9A:
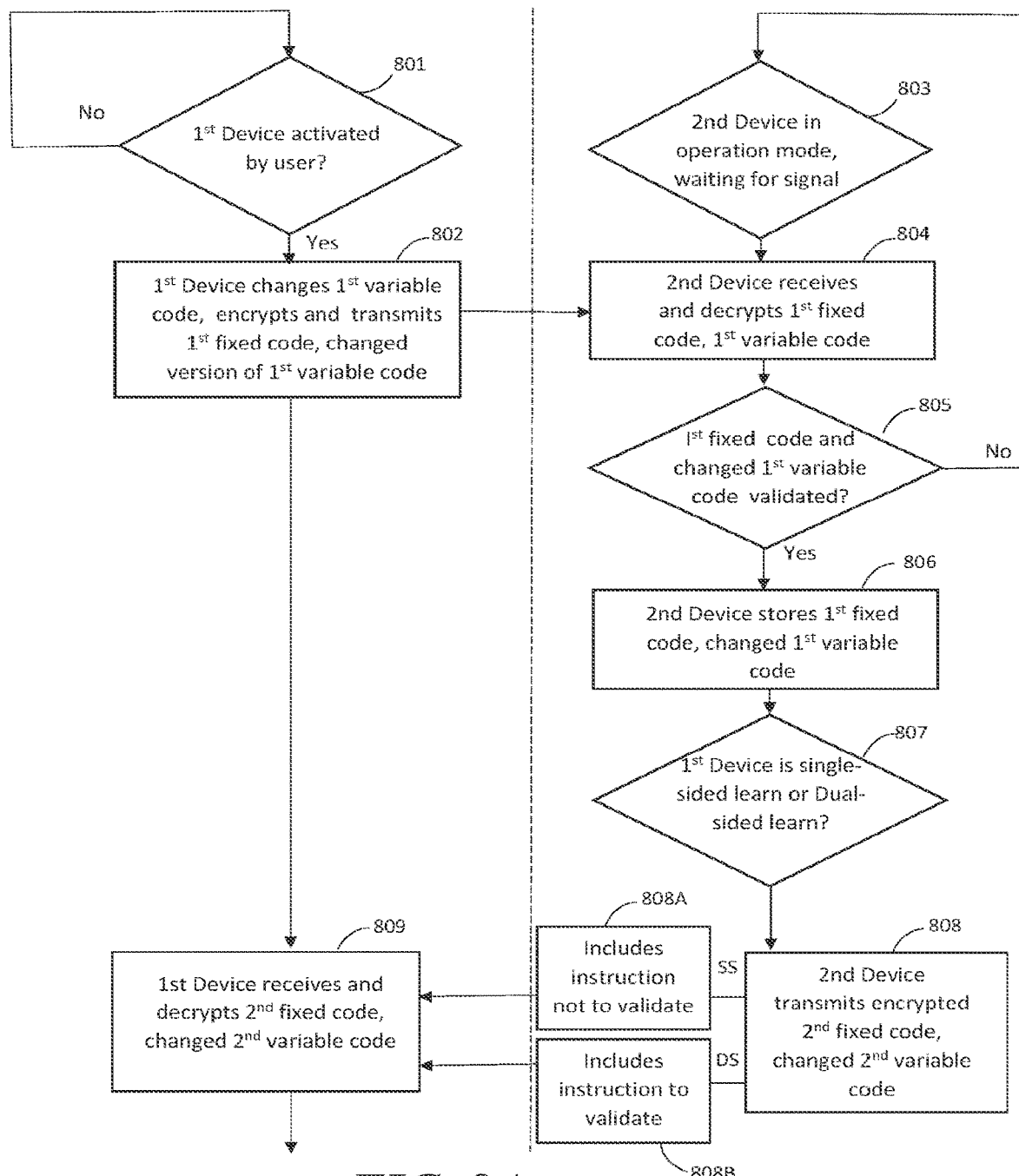
FIGS. 9A-C are interconnecting flow diagrams showing an example communication flow between a first device and a second device during normal operation.
Figure 9B:
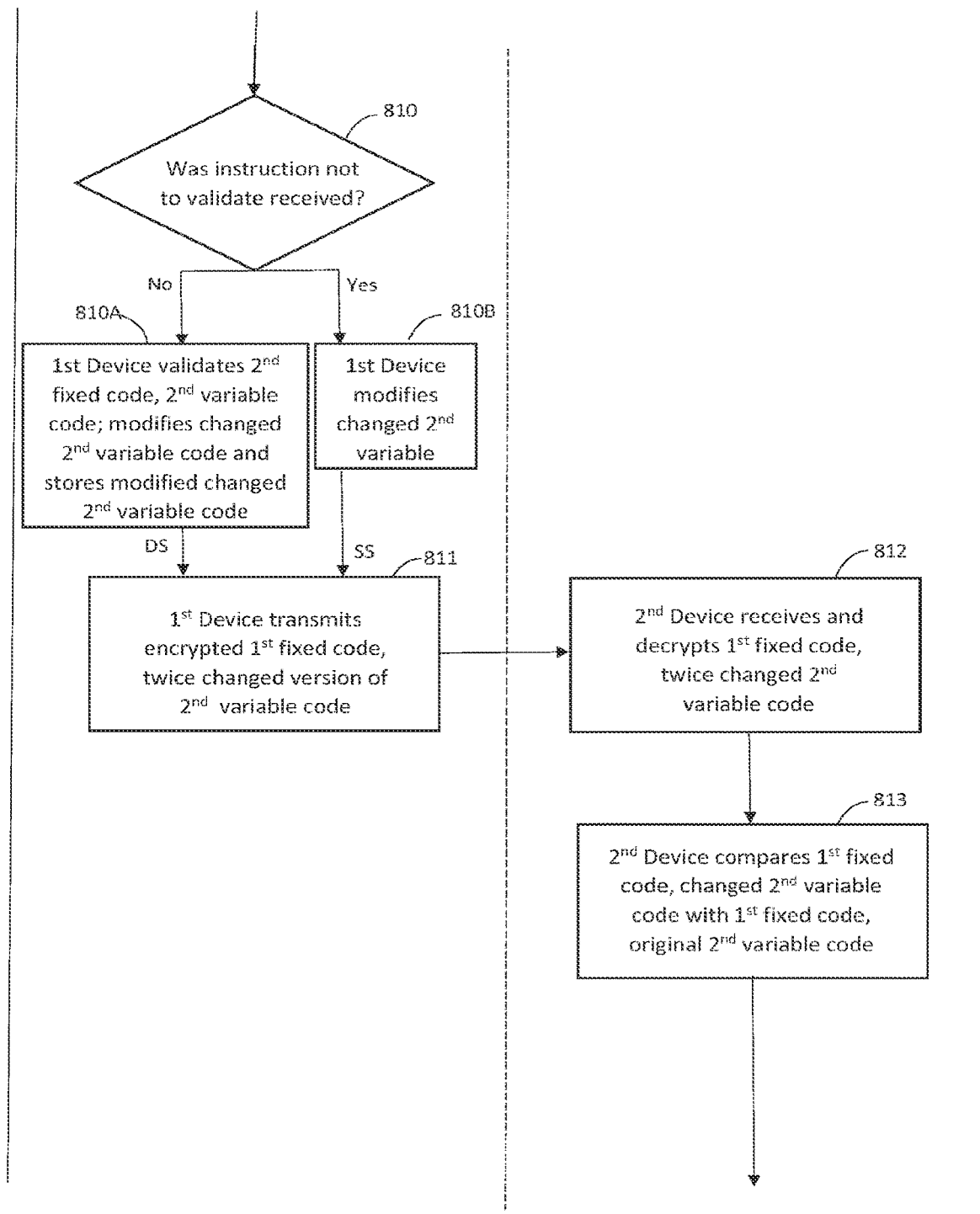
Figure 9C:
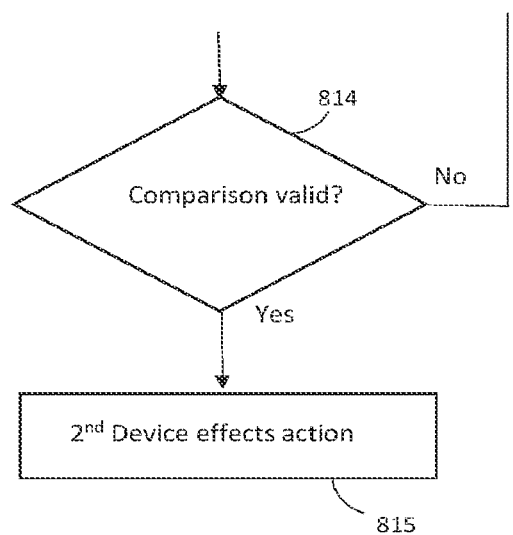

FIGS. 9A, 9B, and 9C are interconnected flow charts that demonstrate operation of a second device by a learned first device. In this example, a first device (such as a handheld or in-vehicle control device) commands a second device (such as a garage door operator) to take or effect performance of an action through encrypted transmissions of variable codes.

Initially, the first and second devices both have stored in their memories a first fixed code and first variable code from the immediately previous operation involving the first device. When the first device is activated by a user in a manner intended to cause an action by the second device, such as by pressing an activation button (step 801), the first device changes the first variable code according to a preset algorithm (such as by incrementing a rolling code) and creates a first message that includes a first fixed code corresponding to the first device and a first changed version of the first variable code. The changed variable code is stored in the memory of the first device, and is also encrypted using one or more encryption methods and transmitted to the second device (step 802). Other information associated with the first device, such as a payload relating to a DIP switch configuration of the first device, may also be included in or accompany the first encrypted message transmitted to the second device in step 802. After transmission of information to the second device, the initial value of the rolling code may be optionally deleted from the first device memory. The first device may optionally also determine a time window or delay in which it expects to receive a response. The time window may be determined from one or both of: the rolling code values or a portion thereof; or from the first encrypted message or a portion thereof. The time window may represent a relative time period (e.g. beginning and end points at specific time intervals from a specific action such as the initial button press or the transmission of the first encrypted signal) or an absolute time period (e.g. based on time values according to a time device such as an oscillator or real time clock (RTC) of the first device (or in communication with the first device) that is synchronized with a time device of the second device (or in communication with the second device)).

The second device, which has been placed in operation mode and awaiting signals (step 803), receives the first encrypted message from the first device, decrypts the message to obtain the first fixed code and first changed version of the first variable code (step 804). The second device then compares the first fixed code and changed first variable code received from the first device to expected values based on stored code values and attempts to validate (step 805) the first fixed code ensure that the first device is a learned device, and also validates the changed version of the first variable code by comparing the changed version of the first variable code to the previous version of the variable code and determining if the changed version of the first variable code matches an expected value. If the first fixed code and first changing code from the first encrypted message are not validated, communication between the devices ends. If the second device confirms that the first fixed code is associated with a learned device and the changed first variable code has been properly changed relative to the previous version of the first variable code, the second device stores the new values for the first fixed code and changed first variable code in a memory (step 806).

The second device also determines if the first device was associated with a single-sided learning process (SS) or dual-sided learning process (DS) (step 807) in order to decide how to proceed in responding to the first device. The learning process (see FIGS. 5A-5C) associated with the first device may determine whether the first device validates incoming messages from the second device by comparison to stored values, or alternatively new instructions may be generated in a similar manner to that described in connection with the pairing process. The second device may determine whether the first device should attempt to validate the response from the second device by reference to the second fixed code, another portion of the first encrypted message, a different stored value from the learning process or a previous operation, some portion or characteristic of the first encrypted message received at step 804, other information received from the first device, or other methods. The second device then transmits (step 808) a response comprising a second encrypted message derived from a second fixed code corresponding to the second device and changed version of a second rolling code that is independent from the first changing code and represents a modified version of the second changing code from the immediately previous operation. These values are stored in the second device's memory. If the first device is associated with a single-sided learning process (SS), the second encrypted message contains or is accompanied by an instruction not to store the second fixed code or changed second variable code (step 808A). If the first device is associated with a dual-sided learning process (DS), the second encrypted message contains or is accompanied by an instruction to store the second fixed code or changed second variable code (step 808B).

The first device then receives and decrypts the second fixed code and second variable code (step 809). The first device optionally may perform validation of the second encrypted message prior to decryption, such as by confirming that the second encrypted message was received within an expected time window relative to activation of the first device (step 801) or other methods of validation.

The first device then determines (step 810) whether an instruction not to validate the response was received from the second device. If the first device received an instruction from the second device to validate (or not to avoid validating, depending on the default protocol) the response, the first device will compare the second fixed code to a stored value; compare the changed second variable code to a stored second variable code to determine if the changed version of the second variable code matches an expected value derived from the stored version of the second variable code; further modify the changed second variable code to create a twice changed version of the second variable code; and store the twice changed version of the second variable code (step 810A). On the other hand, if the first device was instructed not to validate the response, the first device simply modifies the changed second variable code without validating the received fixed or variable codes (step 810B). In each scenario, the first device then encrypts the first fixed code and twice changed version of the second variable code to assemble a third encrypted message and transmits the third encrypted message to the second device (step 811). The second device receives and decrypts the first fixed code and twice changed second variable code (step 812), compares them to stored versions (step 813), and determines if they are valid (step 814). If the first fixed code and twice changed second variable code are validated, the second device effects performance of an action such as moving a barrier (step 815). If one or both codes are not validated, communication with the first device is terminated and the second device returns to the ready state.

The operation mode as shown in FIGS. 9A-9C may be performed on the same frequency as learn mode as shown in FIGS. 5A-5C, and may utilize multiple frequencies. In some embodiments the first device and the second device communicate wirelessly in the operation mode and/or the learn mode via one or more frequencies, channels, bands, and radio physical layers or protocols including but not limited to, for example, 300 MHz-400 MHz, 900 MHz, 2.4 GHz, Wi-Fi/WiLAN, Bluetooth, Bluetooth Low Energy (BLE), 3GPP GSM, UMTS, LTE, LTE-A, 5G NR, proprietary radio, and others. In other embodiments, the first device and the second device communicate in the operation mode and/or the learn mode via a wired connection and various protocols including but not limited to one or more of wire serial communication, Universal Serial Bus (USB), Inter-integrated Circuit (I²C) protocol, Ethernet, control area network (CAN) vehicle bus, proprietary protocol, and others. In some embodiments, the maximum distance between the first device and second device may vary between learn mode and operation mode, while in other modes the maximum range will be the same in both modes due to variation in range from interference.

Figure 10:
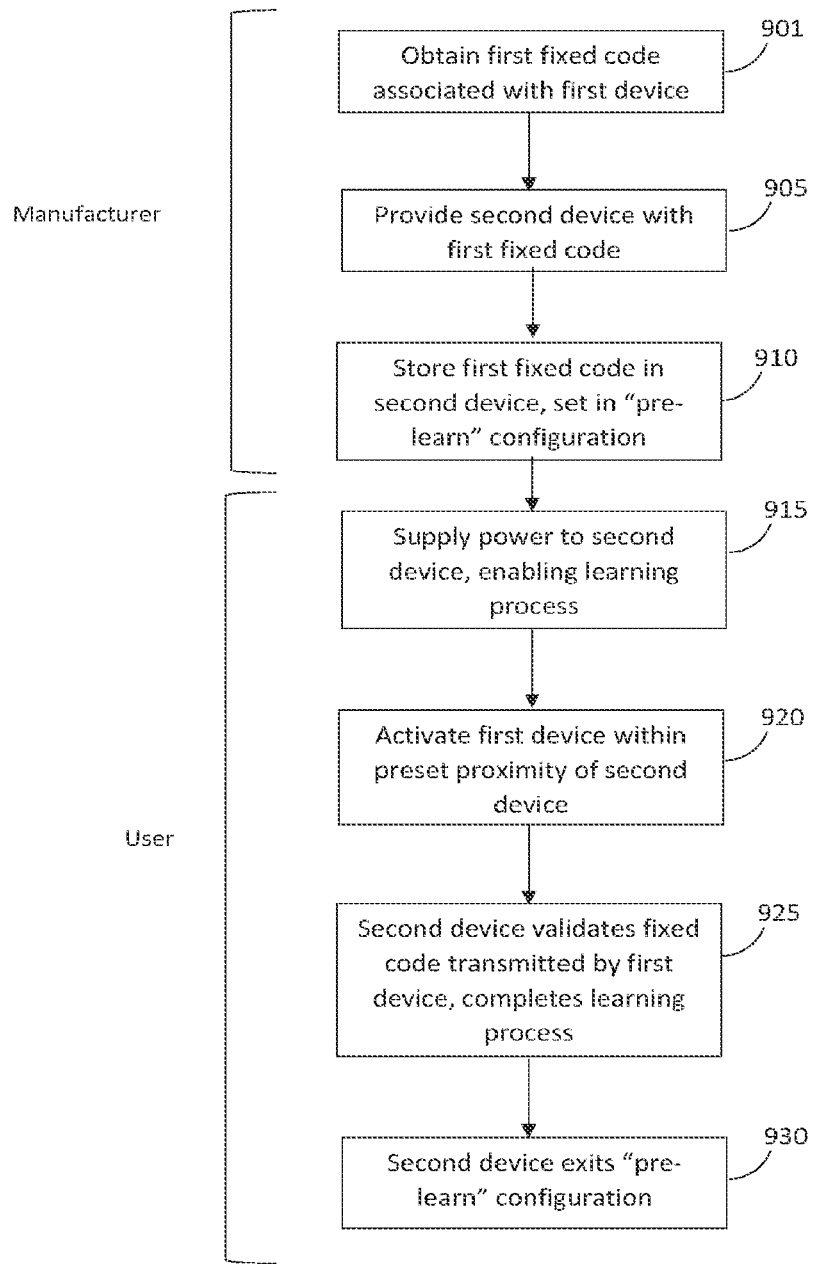
FIG. 10 is a flow diagram showing illustrating one example of a pairing process utilizing a pre-learned device.

In some forms, a pairing method may be simplified so that it is not necessary to activate one or more manual DIP switches or otherwise set one or both devices to a learn mode in order to effect pairing of devices. In the context of an overhead garage door opener, the present simplified pairing method eliminates the need to program a control device (e.g., a handheld transmitter) to a learn mode and/or the need to take steps such as climb a ladder and manually activate the learn mode of the garage door opener. FIG. 10 illustrates one example of a simplified pairing method that utilizes a pre-learned device for pairing with another device. In the illustrated form, a manufacturer performs a small number of steps to place a device in a "pre-learn" configuration, and then a user or purchaser of the device actuates another device to automatically initiate the pairing function. The pre-learn configuration reduces the time spent pairing for the manufacturer and allows the user to pair the devices with a single action, such as a single push of a single button. In the embodiment illustrated in FIG. 10, the manufacturer obtains a fixed code stored in a memory coupled to a first device (step 901). This fixed code in some forms may have been, for instance, programmed into a memory located within the first device, or alternatively accessible by the first device through a physical or wireless connection. In some forms, the fixed code of the first device is also placed on a bar code or other scannable element affixed to the exterior of the first device in order to make the first fixed code readily available without activation of the first device. The first device may be, for instance, a control device such as a transmitter for a moveable barrier operator system. The fixed code of the first device may be obtained in any manner, for instance by scanning a code element located on the first device with an optical scanner, communicating with the first device via radio frequencies, connecting the first device to a physical computing device or local network, reading a label of the first device and manually inputting information to another device, or any other known manner of obtaining information from a transmitter device. In some forms, determining the first fixed code by scanning a bar code or other optical recognition means is advantageous by eliminating the possibility of radio frequency interference issues during the manufacturing process.

A second device is then provided with the first device's fixed code (step 905) during the manufacturing process. Any manner of providing the fixed code may be employed, for instance by transmitting the code to the second device via radio frequencies or a hard wire connection, manual entry of the code, or any other method. The fixed code is stored in the second device, and the second device is set in a "pre-learn" configuration (step 910) wherein receipt of an incoming transmission of a valid type will automatically initiate a learning process. The second device is then powered down or otherwise prevented from receiving transmissions in order to avoid accidentally triggering a learning process. The first and second devices are packaged together and sold as a system, allowing a person other than a manufacturer to complete the learning process.

A user, such as an installer or purchaser of the first and second devices is then able to easily effect a pairing process in which one or both of the first and second devices learn the other device by exchanging fixed and variable codes, pairing the devices to one another. In the illustrated embodiment, the user energizes or otherwise turns on the second device by supplying power from an electrical source (step 915), which automatically enables a learning process due to the second device being set in the pre-learn configuration. The user then activates the first device in range of the second device (step 920), causing the second device to receive a message that includes the first fixed code and a first variable code. The message sent by the first device to the second device may optionally include additional information, such as a payload representative of the configuration of a DIP switch of the first device. In some forms, the DIP switch may be an array or series of switches, so that the payload is representative of the overall configuration of a plurality of DIP switches.

In the pre-learn configuration, the second device is configured to automatically store a first variable code upon confirming that the first variable code is associated with the stored fixed code of the first device, and then provide a response that comprises a second fixed code associated with the second device, initiating a learning protocol between the first and second device (step 925). The learning protocol may utilize various steps and/or encryption methods as discussed above. For instance, an actuation of the first device may result in proceeding directly to step 457 of the learning process illustrated in FIGS. 5A-5C due to the second device being set to a pre-learn configuration and allows the first and second devices to then proceed through the remaining steps of that process. The second device then exits (step 930) the pre-learn configuration to prevent subsequent activations of the first device or another similar device from initiating the learning protocol. The second device may be configured to exit the pre-learn configuration upon, for instance, confirmation that the first and second devices are paired or the expiration of a time window initiated upon activation of the second device or upon receipt of a first message from the first device.

In some embodiments, a pairing function between a first device and pre-learned second device is achieved by receiving at the second device a first encrypted message that includes at least a first fixed code and a first variable code; validating the first fixed code by comparing the first fixed code to stored values; storing by the second device the first variable code upon validation of the first fixed code without comparing the first variable code to stored values; transmitting a response from the second device, wherein the response comprises a second encrypted message comprising a second fixed code; receiving and storing by the first device the second fixed code; sending by the first device a third encrypted message comprising the first fixed code and a changed version of the fixed variable code; receiving by the second device the third encrypted message comprising at least the first fixed code and a changed version of the first variable code; validating by the second device the third encrypted message by comparing the first fixed code and the changed version of the first variable code to stored code values from the first encrypted message; transmitting by the second device in response to validating the third encrypted message a fourth encrypted message including the second fixed code and a second variable code; and storing by the first device the second fixed code and second variable code.

In some applications, a plurality of receivers may be paired to a single controller, such as in a warehouse or other storage facility with many moveable barriers in close proximity under the control of a single user. The plurality of receivers (e.g. barrier operators) may be configured to first inspect a particular portion of incoming signals before reading any other portion of the signal, and only initiate further communication with the controller if inspection of the specific portion reveals an identifier that is associated to the receiver reading the message. For example, a method of communicating between a first device and a second device may comprise receiving at the first device an identifier corresponding to the second device; transmitting a first message from the first device, the first message including a first fixed code, a first changing code, and the identifier, the identifier being separate from the first fixed code and first changing code; and at the second device, determining if the identifier matches a stored value and responding to the first device with a second message comprising a second fixed code and a second changing code only when the identifier matches a value stored by the second device. In some forms, the first device may include a keypad for receiving an input of the identifier from a user. In further forms, the first device may validate the second fixed code and second changing code by comparison to stored values, and also may send a third message comprising the first fixed code and a changed version of the second changing code to the second device, so that the second device is able to validate the third message and performs an action only upon validating the third message.

Figure 11A:
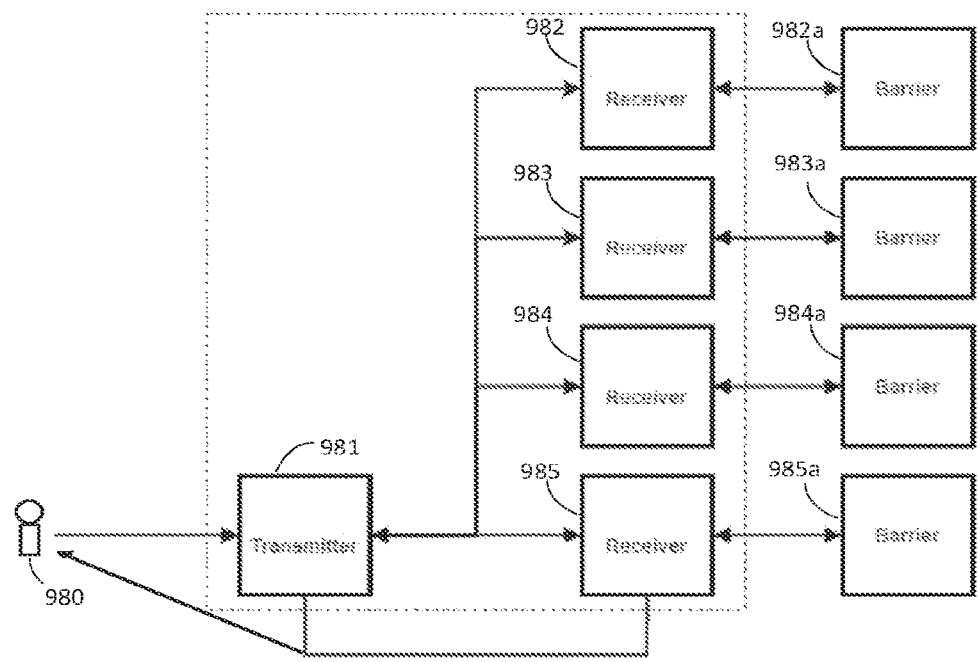
FIG. 11A is an example diagram showing a single transmitter paired to multiple barrier operators to demonstrate a manner of selectively controlling one of a plurality of receivers.

An apparatus configured to perform any one or more of the foregoing methods may also be provided. A non-transitory computer readable medium may also be provided having stored thereon instructions that when executed by a controller circuit cause performance of operations comprising one or more of the foregoing methods, for instance as part of an apparatus for performing the method(s). In one example, a device may be provided that comprises a control circuit configured to receive a first message including a first fixed code, a first changing code, and an identifier separate from the first fixed code and first changing code; before reading the first fixed code or first changing code, determine if the identifier matches a stored value stored in a memory of the device; and only upon determining if the identifier matches the stored value (i) read the first fixed code and first changing code and (ii) send a second message comprising a second fixed code and a second changing code. In some forms, the control circuit of such a device is further configured to cause the device to perform an action upon validating a third message comprising the first fixed code and a changed version of the second changing code when the first fixed code and a changed version of the second changing code match stored values in a memory of the device. FIG. 11A illustrates a scenario in which a single controller is paired to a plurality of barrier operators and may selectively activate the operators by transmitting an identifier (such as a PIN code) specific to one of the plurality of barrier operators. Such a situation may exist, for instance, in a warehouse, where several separate storage areas are secured by separate barriers and selectively accessed using a single control device. When communication between the controller and barrier operators is achieved through systems where the controller can only connect to a single barrier operator at a time, such as Bluetooth Low Energy (BLE) systems, it is inefficient for the control device to serially connect to and conduct a bidirectional communication sequence with each listening barrier operator. Inefficiencies are compounded because BLE devices advertise to all receivers within a preset radius under a generic access profile (GAP) instead of locating a specific device. Once a connection between devices is established, a generic attribute profile (GATT) governs communications between the devices. This can lead to a poor user experience when there are a plurality of similar devices available for connection, due to the randomness of connections under the GAP and relatively long processing times required for each barrier operator to communicate with the controller under the GATT. To address this example scenario each of the plurality of receivers paired to a single controller may be configured to inspect signals from the controller for a specific portion of messages immediately upon receipt, and initiate further communication with the controller when the specific portion includes an identifier that is specific to that receiver. For instance, when the user 980 in FIG. 11A activates a BLE transmitter 981 identifying a specific receiver to be controlled (for instance, by pressing one specific button from a plurality of buttons, entering a receiver identifier on a keypad, etc.), the transmitter 981 advertises a first message in a bidirectional communication sequence (for instance a message of the type described above in FIGS. 9A-C). The advertising of this message may repeat, e.g. in a loop, for a predetermined period of time until a response is received from another device or until the period of time expires. A plurality of receivers 982-985 each configured to operate a respective barrier (respective barriers 982a, 983a, 984a, and 985a) each receive the advertised message from transmitter 981 and inspect a designated portion of the message (for instance, a payload of the message, a portion of the message header, or a portion of a changing code) and compare the values of that designated portion to stored values that are unique to the given receiver. In one example, a transmitter may send three-part messages having a fixed identifier unique to the transmitter, a rolling code that is incremented upon each actuation of the transmitter, and a payload, and when a user enters an identifier unique to one of a plurality of receivers into a keypad of the transmitter the identifier is added to the payload and a message is sent. When each of the plurality of receivers reads the message, the receivers can be configured to inspect the payload first to see if the identifier located therein is associated with that particular receiver. If transmitter 981 connects to a particular receiver and the identifier transmitted by the transmitter 981 does not match the values stored by the particular receiver, that receiver quickly disconnects from the transmitter so that another receiver may connect and inspect the identifier. Upon disconnecting, the receiver may in some embodiments ignore incoming signals for a preset period of time in order to avoid reconnecting with the transmitter during the same operation. Once a receiver successfully matches the identifier sent by the transmitter 981 to a stored value, the receiver will send a response message, that partially constitutes a session of a bidirectional communication protocol that eventually causes that receiver to move an associated barrier. This establishment of a bidirectional communication session may result in other receivers timing out so that the other receivers do not need to inspect the identifier after the transmitter 981 has successfully communicated with another receiver.

For example, if the user 980 uses transmitter 981 to select or input an identifier associated with receiver 985 that is configured to move barrier 985a, transmitter 981 will advertise the identifier to all available receivers (982, 983, 984, and 985) and randomly connect to a first receiver. If receiver 985 connects to transmitter 981 first, the receiver 985 will inspect the identifier sent by transmitter 981, determine that the identifier is associated with receiver 985, and initiate bidirectional communication protocol. As a result, the other receivers (982, 983, and 984) will fail to connect and do not use resources for determining whether the advertisement is intended to cause movement of their respective barriers. On the other hand, if another receiver connects first, for instance receiver 984, then the receiver 984 will inspect the identifier sent by transmitter 981, confirm that the received identifier does not match a stored identifier value, and then ignore the remainder of the message sent by transmitter 981 and disconnect. Once receiver 984 has disconnected, another receiver will connect to transmitter 981, and this process will continue until receiver 985 successfully connects and initiates the bidirectional communication protocol.

Figure 11B:
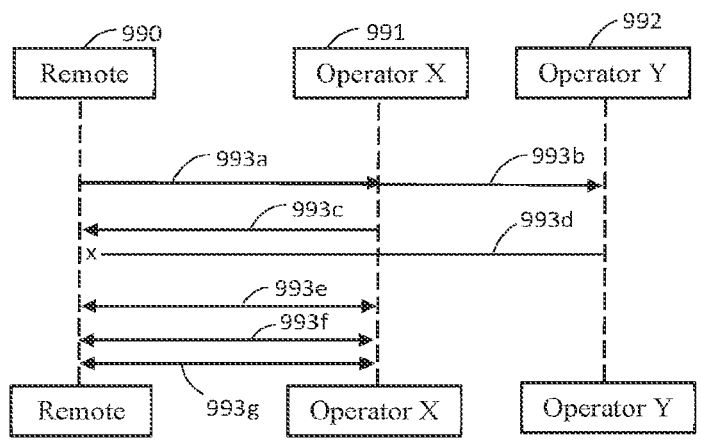
FIG. 11B is a flow diagram demonstrating how a remote control advertises to a plurality of operators.

In FIG. 11B multiple operators ('Operator X' 991 and 'Operator Y' 992) such as barrier operators communicate via Bluetooth Low Energy (BLE) and are learned to a single remote control device 990. Although only two operators are shown, any number of operators may be present and learned to the remote control 990. The remote control 990 can advertise 993*a* repeatedly, connecting to one of the operators randomly and then advertising again after the connection with the first operator is finished, allowing other operators to connect and process the advertised message. This re-advertising process can be repeated until all operators connect and process the message. When the remote control advertises, the same message is sent repeatedly for a short period of time in order to allow operators to connect. Each of Operator X 991 and Operator Y 992 analyze the advertised message to determine if that operator has already processed the message. For instance, the advertised message may contain a Device ID (identifying the remote control 990) and a changing code identifying the particular message (which changes with each activation of the remote control) that each operator can compare to stored values to determine if that operator has responded to that message from that remote control. In FIG. 11B, Operator X receives 993*a* the advertisement from Remote 990, does not recognize the advertised combination of Device ID and changing code, and sends a connection request 993*c*. Operator Y, however, receives 993*b* the same advertisement from Remote 990, does recognize the Device ID and changing code combination, and therefore does not send a connection request 993*d* in order to avoid acting twice on the same message from the same remote control 990. Receiving only one connection request, the remote control 990 sends a connection response 993*e* to Operator X, and the remote control 990 and Operator X 991 are connected. While connected, remote control 990 and Operator X 991 exchange an operational message sequence 993F intended to cause Operator X to effect an action (e.g. similar to the message sequence shown in FIGS. 9A-C). If both operators attempt to connect simultaneously, the remote 990 will only send a connection response to (and therefore establish a connection with) one operator at a time. The order in which the connections are established is not predefined, and it is possible for the remote control to conduct the full messaging process with each operator until one of the operators is successfully activated or until all operators connect to the remote control. Alternatively, as was discussed in connection with FIG. 11A, Operator X and Operator Y may each be configured to analyze a specific portion of the first message from the remote control 990 in the operational message 993*f* to determine if the remote control is targeting a specific operator, avoiding a prolonged connection with operators for which the message is not intended. For instance, the remote control 990 may send a payload containing a PIN or other identifier that is specific to one of the operators, and after connecting each operator will immediately disconnect and block future connections of the same message if it does not recognize the PIN or other identifier. The remote control 990 will cease advertising after a preset amount of time, which could be determined from the time that the remote control 990 first began advertising, from the last received connection request, or from some other point in time. For instance, the remote control 990 may time out and cease advertising if no connection requests have been received within a predetermined time period, which would indicate that all operators have responded to the message or determined not to respond and that the process of communicating with operators is complete.

Figure 11C:
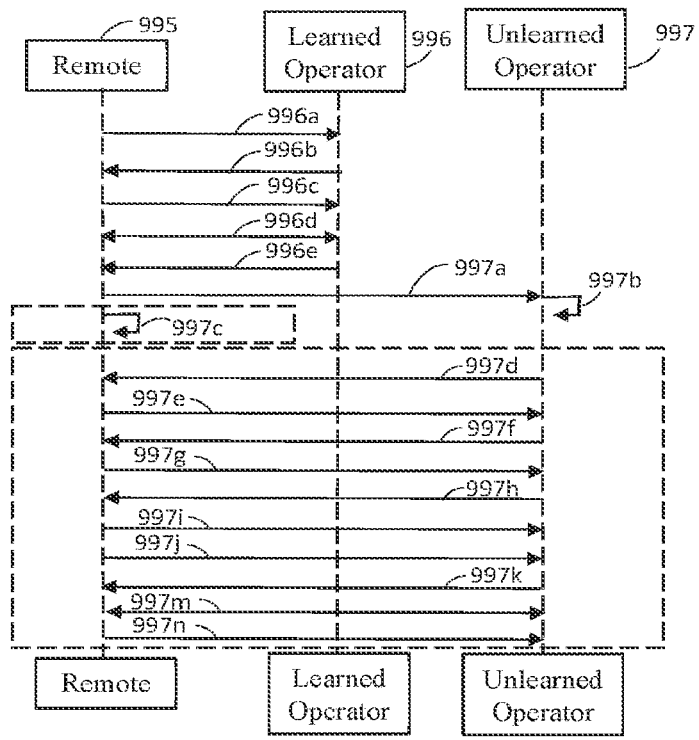
FIG. 11C is a flow diagram demonstrating how a remote control advertises to specific operators among a plurality of operators.

FIG. 11C shows a method of targeting one specific operator among a plurality of operators using Bluetooth Low Energy (BLE). If one remote control device 995 is learned by multiple operators, the remote can selectively advertise to a particular operator, and may sequentially advertise to different operators after the connection with each previous operator is finished. This selective re-advertising process can be repeated until all operators connect and process the message in a particular order. For instance, the remote control 995 may use the BLE Destination Address field in a Manufacturer Specific Data section of the Advertisement Data set to direct a message specifically to the BLE Address of a specific learned operator. Using destination address fields, the remote control 995 can advertise to connect with the operators in an orderly fashion. The remote will advertise to connect to a single learned device, one at a time, after the previous connection is completed or an advertising timeout to the previous operator occurred. Remote control 990 first selectively advertises to one or more learned operators 996. The remote control 990 advertises 996*a* with a destination address field set to a specific operator address, and the learned operator responds with a connection request 996*b*. The remote control 995 sends a connection response 996*c*, connecting remote control 995 and 996, and then an operational message sequence 996*d* (e.g. similar to the process in FIGS. 9A-C) is conducted in order to attempt to cause the learned operator 996 to effect an action. After the operational message sequence 996*d* is complete, or fails because one of the messages cannot be validated by one of the devices, the connection will terminate 996*e*. Once the connection to the learned operator is terminated, the remote control 995 can re-advertise using another destination address. This process can be repeated until the remote control 995 has connected to all learned transmitters. This process may be best suited for remotes and operators used in a relatively confined location, because a remote control learned to operators in locations that are spaced far apart would attempt to advertise and connect to all learned operators even if some operators are out of range.

In FIG. 11C, after connecting with all learned operators the remote control 995 can issue an untargeted advertisement in order to connect with other operators that are in learn mode. The remote control 995 will advertise 997*a* for a short period without a specified destination address to allow new operators in learn mode to connect. An unlearned operator 997 that is placed in learn mode will analyze the Device ID and changing code advertised by the remote control 995 to determine 997*b* if the unlearned operator 997 has already processed the message advertised 997*a* by the remote. If no operators attempt to connect, the remote control will cease 997*c* advertising upon a specified timeout condition. If, however, an unlearned operator 997 does not recognize the advertisement it will send a connection request 997*d*, prompting a connection response 997*e* from the remote control 995 and connection of the devices. The remote control 995 and unlearned operator 997 may then exchange maximum transmission unit (MTU) requests 997*f*, 997*g*, 997*h*, and 997*i* to set the maximum size of protocol data unit (PDU) that each device can accept. The unlearned operator 997 will then read 997*j* the Device ID of the remote control 995, and if appropriate respond 997*k* to initiate a learn message sequence 997*m* (e.g. similar to that shown in FIGS. 5A-C). Once the learning process is complete, the connection 997*n* will terminate.

In some forms, first and second devices also may be configured to indicate when a user has placed them in a learning mode in order to assist in pairing the desired devices and avoid one or both of the devices unintentionally learning a third device instead of the intended device. The same or different messages from the first device may also include other instructions, for instance instructions to unlearn, or erase information relating to, the first device. In this manner, learning of a specific device may be prioritized over learning of other devices, and the second device may be otherwise managed remotely. For example, a method of operating a first device configured to communicate with a second device to cause the second device to reconfigure the first device may comprise setting at least a portion of a first changing code of the first device to a set value; transmitting from the first device a first message that includes at least a first fixed code and the first changing code having the set value; receiving by the first device a second message including a second fixed code and second changing code, a portion of the second message selected by the second device in response to the set value of the first changing code; and reconfiguring a memory of the first device based on the portion of the second message selected in response to the set value of the first changing code. In some instances, the second message may be configured to instruct the first device to store the second fixed code, and in some further instances the second changing code may be set to a second specific value. In some other instances, a portion of the second message may be configured to instruct the first device to remove information from the memory of the first device. In some forms, the method may further include transmitting a third message from the first device in response to receiving the second message, the third message confirming to the second device that the first device received the second message.

An apparatus configured to perform any one or more of the foregoing methods may also be provided. A non-transitory computer readable medium also may be provided having stored thereon instructions that when executed by a controller circuit cause performance of operations comprising one or more of the foregoing methods, for instance as part of an apparatus for performing the method(s). In one example, an apparatus is configured to communicate with a device to cause the device to reconfigure the apparatus, the apparatus comprising a control circuit and a memory, the control circuit configured to set at least a portion of a first changing code to a set value upon being placed in a specific mode; transmit a first message that includes at least a first fixed code and the first changing code having the set value; receive a second message including a second fixed code and second changing code, a portion of the second message selected by the device in response to the set value of the first changing code; and reconfigure the memory based on the portion of the second message selected in response to the set value of the first changing code. In some instances, the control circuit of the apparatus is configured to cause the memory to store the second fixed code based on the portion of the second message selected in response to the set value of the first changing code. In some instances, the control circuit of the apparatus is configured to erase information from the memory in response to the portion of the second message when the portion has a second set value. In some instances, the control circuit of the apparatus is further configured to cause the apparatus to transmit a third message, the third message confirming to the device that the apparatus received the second message.

Figure 12:
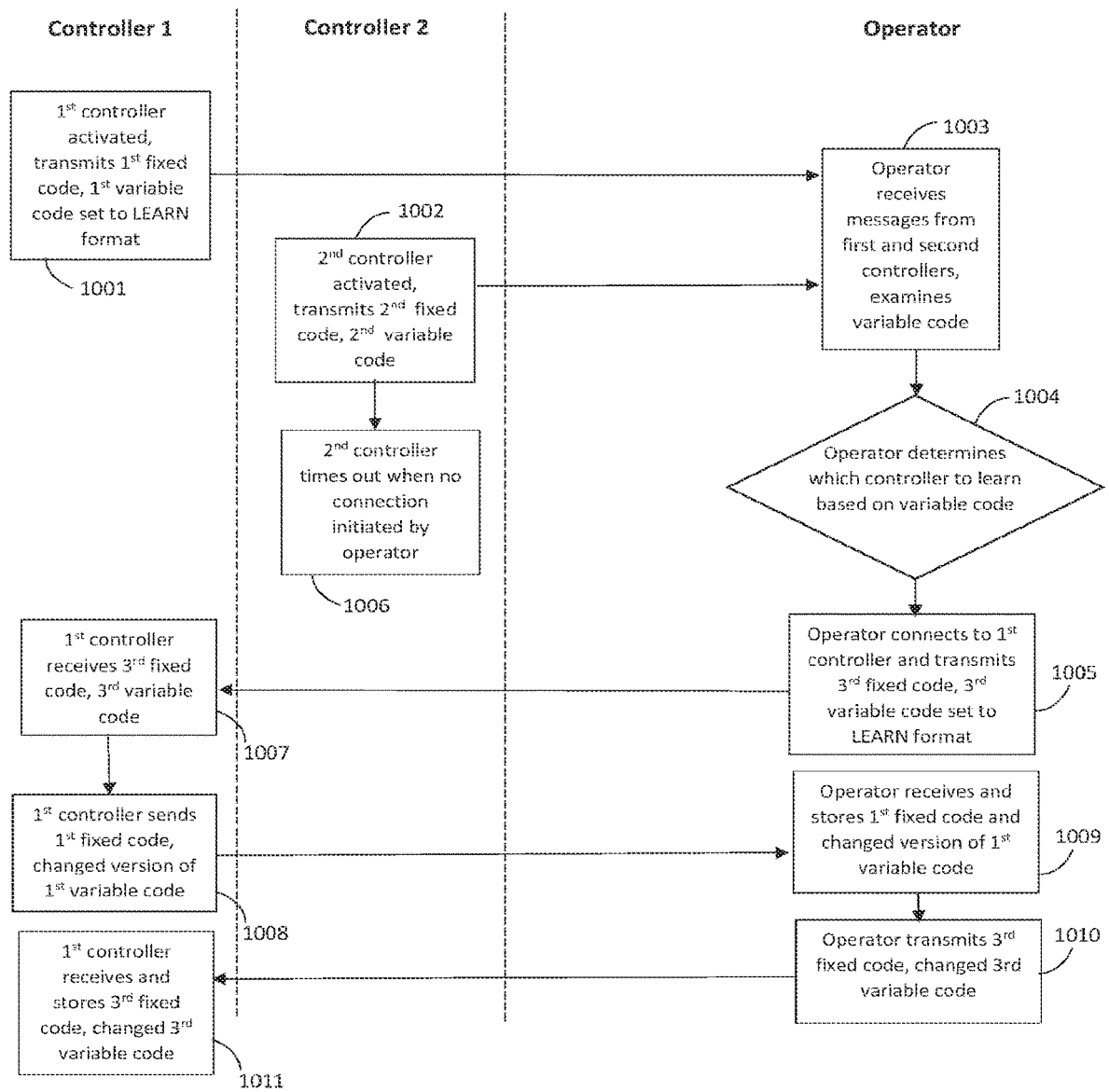
FIG. 12 is a flow diagram showing an example of a prioritized bidirectional learning process.

FIG. 12 is a flow chart demonstrating a prioritized learn process in which an operator (such as a moveable barrier operator e.g. garage door opener/closer) is configured to determine whether controllers are in a learn mode prior to beginning the learning process. This illustrated process allows the operator to either prioritize the learning of controllers that are in learn mode or ignore requests to learn controllers that are not in learn mode, depending on the logic of a control circuit of the operator. A first controller designated as 'Controller 1' is activated 1001 (e.g. by the user pushing a button on Controller 1, turning on Controller 1, Controller 1 passively advertising its presence, etc.) Controller 1 transmits a first fixed code identifying Controller 1 and a first variable code or rolling/changing code. In this instance, the first variable code transmitted by Controller 1 is a "learning code" (i.e. set to a specific value or a specific format configured to be recognized by Operator as an indicator that Controller 1 is in a learn mode). Controller 1 may be set to learn by the user pressing a designated button or taking some other action (e.g. a specific set of button presses or pressing a button for a specified amount of time), or automatically (e.g. due to Controller 1 not having learned another device yet). At 1002, a second controller, designated 'Controller 2,' is activated and transmits a second fixed code identifying the second controller and a second variable code that is different, distinct or otherwise independent of the first variable code. In this instance, Controller 2 may or may not be previously learned by or paired with the Operator, and the second variable code is not a learn format/value and therefore will not be recognized by Operator as indicating that Controller 2 is in learn mode. At 1003, Operator receives messages from Controller 1 and Controller 2, and examines the variable code of the transmission from each controller (for instance, by comparing the variable code values or a portion thereof to information in a lookup table). Operator determines 1004 which of Controller 1 and Controller 2 to learn based on the variable codes transmitted by the controllers. The Operator may be programmed in a variety of ways to select which of Controller 1 or Controller 2 to learn. For instance, the Operator may be configured to only learn controllers placed in learn mode, so that regardless of the order in which transmissions are received from Controller 1 and Controller 2, the Operator will ignore the transmission from Controller 2 when Operator is in learn mode. Therefore, in such a configuration the Operator will only act upon determining that Controller 1 has transmitted a variable code set to a learn format/value, and the Operator will respond with a message to Controller 1 in order to continue the learning process. Alternatively, the Operator may be configured to open a time window upon receiving a transmission from either Controller 1 or Controller 2, and will conduct the determining step 1004 upon expiration of the time window so that when multiple transmission are received in a relatively short time period the Operator may determine which signal to prioritize based on the variable code of each transmission. In that case, regardless of the order in which Controller 1 and Controller 2 transmit messages, the Operator will read the first transmission, open a time window, read the second transmission if the second transmission is received within the time window, determine that Controller 1 is in learn mode and Controller 2 is not in learn mode, and then communicate with Controller 1 in a bidirectional learning process (beginning at 1005). When the second controller, Controller 2, does not receive a communication from the Operator, the Controller 2 may be programmed to stop attempting to communicate upon expiration of a time window as shown at 1006, or alternatively the Operator could be configured to transmit a termination signal instructing Controller 2 to cease communication. In other embodiments, the Operator may be configured to communicate with Controller 2 after learning Controller 1, in which case Controller 2 would not time out as long as a communication from the Operator is received by Controller 2 before the expiration of the time window, if any, that is predetermined, established, or otherwise set by Controller 2.

As further shown in FIG. 12, upon determining that Controller 1 should be learned, Operator connects 1005 to Controller 1 and transmits to Controller 1 a response message including a third fixed code identifying the Operator and a third variable code set to a learn format/value that is configured to indicate to Controller 1 that the Operator is in learn mode. Controller 1 receives 1007 the third fixed code and third variable code from Operator, and may store the fixed code in order to recall the identity of Operator to validate subsequent communications. Controller 1 then transmits a third message 1008 including the first fixed code (again identifying Controller 1) and a changed version of the first variable code (which is no longer set to the learn format/value). Operator receives 1009 the first fixed code and changed first variable code. At this point, Operator can validate the communication from Controller 1 by comparing the fixed code to a stored value from the initial communication from Controller 1, and will store the changed version of the first variable code that it receives to compare to versions of variable codes of subsequent communications from Controller 1. Operator will transmit 1010 to Controller 1 a fourth message including the third fixed code (identifying the Operator) and a changed version of the third variable code (which is no longer set to learn format/value). Controller 1 receives 1011 the fourth message, and may store the changed version of the third variable code for comparison to versions of variable codes of subsequent communications from Operator. If Operator is configured to communicate with additional devices after prioritizing learning of Controller 1, the Operator will send a message to Controller 2 and initiate a bidirectional learning protocol with Controller 2 that is similar to steps 1005 through 1011.

The method shown in FIG. 12 may further include various layers of encryption and/or authentication to increase security. For instance, the fixed and rolling codes transmitted by each device may be individually or collectively encrypted by one or more known encryption methods, and messages containing the codes may additionally be encrypted using one or more encryption methods. The first and second devices may use, for instance, public keys, private keys, public/private key pairs, block ciphers, stream ciphers, and other techniques. Additionally, one or more other authentication protocols may be employed by one or both devices in order to verify that the other device is an authorized device.

Figure 13:
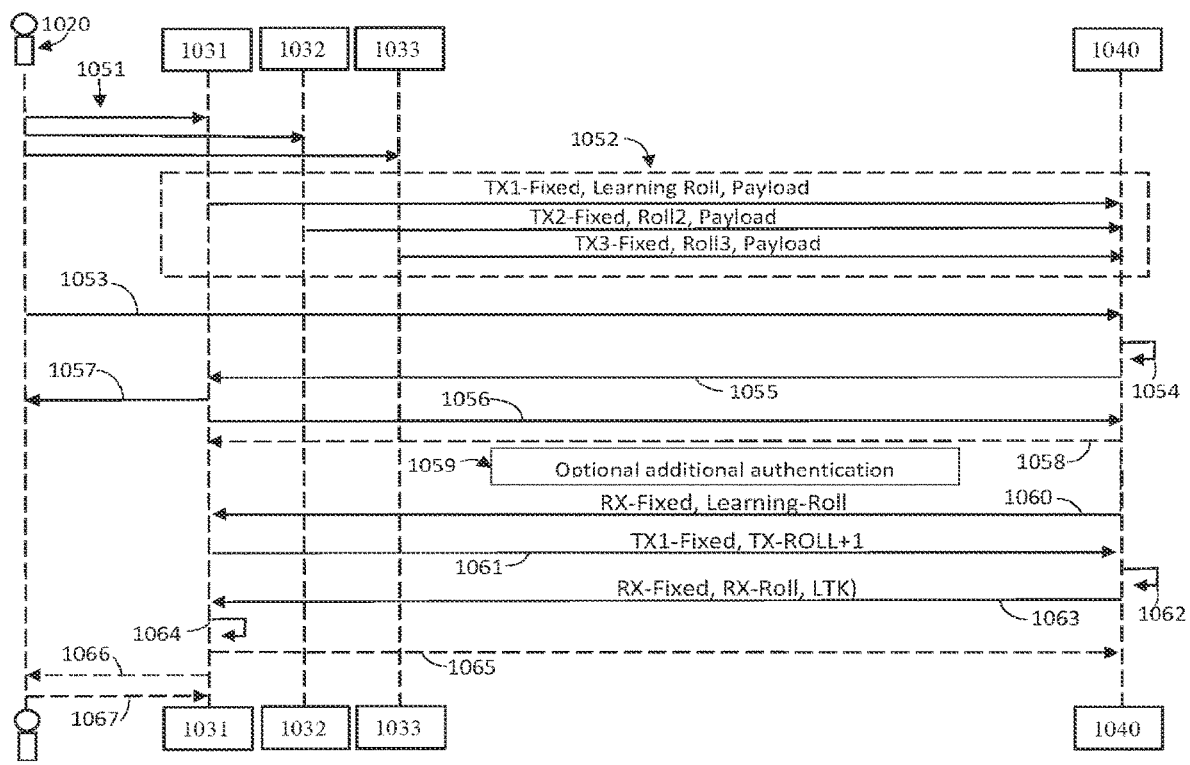
FIG. 13 is a flow diagram showing an example of a prioritized bidirectional learning process using Bluetooth Low Energy (BLE) devices.

FIG. 13 is a method for prioritizing learning of devices, similar to that shown in FIG. 12, with the method in FIG. 13 specifically employing Bluetooth Low Energy (BLE) transmitters and receivers. In the example shown in FIG. 13, three BLE control devices (transmitters 1031, 1032, and 1033) are activated at 1051 by a user 1020. These control devices may be, for instance, hand-held transmitters, visor-mounted transmitters in a vehicle, or the like. Transmitter 1031 is activated in a learn mode, while the other two devices (1032 and 1033) are not in learn mode. At 1052, the three devices advertise, e.g. in a loop, until connected to the BLE Receiver (which may be, for instance, a garage door operator, gate operator, or other device) or until a specified time window expires. As indicated at 1052, transmitter 1031 (which is in learn mode) advertises its universally unique identifier (UUID) and an encrypted "ecode" sequence including a fixed identifier (TX1-Fixed), a learning roll, and a payload. Transmitter 1032 and transmitter 1033 similarly advertise their own UUIDs and encrypted ecode sequences including a fixed identifier, a rolling code, and a payload, but neither of these rolling codes are set to a learning roll. The BLE receiver 1040 is placed into a learn mode at 1053, which can take place before or after the transmitters begin advertising. At 1054 the BLE receiver 1040 detects the learning roll and connects to transmitter 1031 that sent the learning roll, initiating a communication session at 1055. Transmitters 1032 and 1033 are ignored or disregarded by BLE receiver and eventually stop advertising when a timeout condition is reached. Upon connection to BLE receiver, transmitter 1031 may communicate 1057 to the user 1020, for instance by an auditory signal (e.g. a beep), visual signal (e.g. flashing LED lights), or haptic signal (e.g. vibration), that it has connected to BLE receiver 1040. Transmitter 1031 will then request the receiver device ID at 1056, and at 1058 BLE receiver 1040 will send a message with a Device ID, and may also include an encrypted fixed code and rolling code from Receiver. At 1059, additional steps may take place to authenticate transmitter 1031, such as an exchange of credentials, exchange of public keys, etc. At 1060, receiver 1040 sends an encrypted message (e.g. with AES encryption) including an encrypted sequence including the Receiver's fixed code (RX-Fixed) and a rolling code set to a learning roll value ("Learning-Roll," which may be the same or different as the learning roll sent by Transmitter as long as the learning roll value is configured to indicate to Transmitter that Receiver is in learn mode). At 1061, Transmitter sends a message to Receiver that includes an encrypted sequence including Transmitter's fixed code (TX1-Fixed) and an incremented version of transmitter's rolling code (TX-Roll+1). At 1062, receiver 1040 saves the transmitter's fixed code and the incremented version of transmitter's rolling code (TX-Roll+1) to use later when validating messages from transmitter in operation mode. Receiver 1040 also sends 1063 to transmitter an encrypted message including an encrypted sequence that includes the receiver's fixed code (RX-Fixed) and a non-learning roll of the receiver's rolling code (RX-Roll), which are saved to a memory of the transmitter 1031 at 1064 for use later in validating messages from receiver when transmitter is in operation mode. At 1063 receiver 1040 also sends an encrypted long term key (LTK) that may be used to encrypt and decrypt subsequent communications between the transmitter 1031 and receiver 1040. Transmitter 1031 then disconnects from receiver 1040 at 1065, and may optionally indicate 1066 to the user via auditory, visual, haptic, or other signal that it has disconnected. At 1067 the user may then deactivate Transmitter if necessary.

In systems with bidirectional learning where two devices each learn fixed and changing codes of the other device and are each capable of validating messages sent by the other device, reversing the learning process and un-pairing the devices may be more complicated than in systems with unidirectional learning. For instance, in unidirectional learning systems where a first device transmits codes that are learned and validated by a second device but the first device does not learn codes associated with the second device, erasing information from the second device successfully unpairs the devices and reverts them to a state where they may each be paired with other devices. In bidirectional learning systems, however, erasing a first device's codes from a second device will not ordinarily result in mutual unpairing or un-learning in which the second device's codes are also removed from a memory of the first device. As a result, the first device will not automatically reduce the amount of information stored in its memory and may not have sufficient memory to learn a new device.

In addition, in order to erase specific information from paired devices, such as where only one of a plurality of transmitters paired to a receiver is desired to be unlearned, traditionally a user must choose to erase all information from the memory of each device. Deleting all paired transmitter information from a device's memory results in the user restoring a configuration of the device by re-learning all of the devices it was paired with that were not intended to be unlearned. Alternatively, the user could be presented with a user interface that allows the user to select specific information or devices. Such an interface may be provided on the device itself, such as a combination of buttons and a display screen, or separate buttons or switch positions for specific learned devices. Such an interface adds to the cost of the devices, and may in some cases make it difficult for the user to select a device to be unlearned without knowing how the device to be unlearned has been identified and marked by the device with the interface. In addition, in bidirectional systems an interface would likely be needed on each device, further increasing cost and complexity. A cloud-based or server-based application could be provided instead, such as through a smart phone, allowing the user to connect to the receiver and/or transmitter in order to select or block specific data within the memory of one or more of the devices. However, this solution can complicate the unlearn process, and may require the user to know a serial number or other identifier associated with the device which they intend to be unlearned.

One manner in which erasing of devices from both memories of paired devices may be addressed is to use the bidirectional communication pathway of paired devices to have one device instruct the other to erase data. Such mutual unpairing/erasing instruction(s) avoids the need for each device to have a memory management interface, and allows for selective removal of data without a display or multiple inputs that would normally be required for a user to select which data to erase. A user may easily identify which specific devices are intended to be unlearned by activating them in one another's presence in an unlearn mode, as described further herein.

In one example, a method is provided comprising receiving from a first device a first message that includes at least a first fixed code and a first changing code; transmitting from the second device a second message comprising a second fixed code and second changing code, at least a portion of the second changing code set to a set value based on a memory status of the second device, the specific value configured to instruct the first device to erase the second fixed code from a first memory of the first device; and erasing the first fixed code from a second memory of the second device. In some instances, the memory status indicates that a memory threshold of the second device has been reached by storing information in the second memory of the second device. In some instances, the memory status indicates that the first fixed code has been marked for deletion. In some instances, the method further includes receiving a third message from the first device in response to the second message, the third message confirming to the second device that the first device received the second message, and in some further instances erasing the first fixed code from the memory of the second device takes place in response to receiving the third message.

An apparatus configured to perform any one or more of the foregoing methods may also be provided. A non-transitory computer readable medium also may be provided having stored thereon instructions that when executed by a controller circuit cause performance of operations comprising one or more of the foregoing methods, for instance as part of an apparatus for performing the method(s). For example, a barrier operator having a memory and configured to move a barrier when instructed by a control device may have a control circuit configured to receive from the control device a first message that includes at least a first fixed code and a first changing code and transmit to the control device a second message comprising a second fixed code and second changing code, at least a portion of the second changing code set to a set value based on detecting a memory status of the barrier operator, the set value configured to instruct the control device to erase the second fixed code from a first memory of the control device. In some instances, the barrier operator's memory status indicates that a memory threshold of the barrier operator has been reached. In other instances, the memory indicates that the first fixed code has been manually marked for deletion. In another example, a control device may be provided that is configured to instruct such a barrier operator to move a barrier, the control device having a control circuit configured to cause the control device to send to the barrier operator a first message that includes at least a first fixed code and a first changing code, receive a second message from the barrier operator, the second message comprising a second fixed code and second changing code, at least a portion of the second changing code set to a set value based on detecting the status of a memory of the barrier operator, and erase the second fixed code from the memory of the control device in response to receiving the second changing code with the set value.

Figure 14:
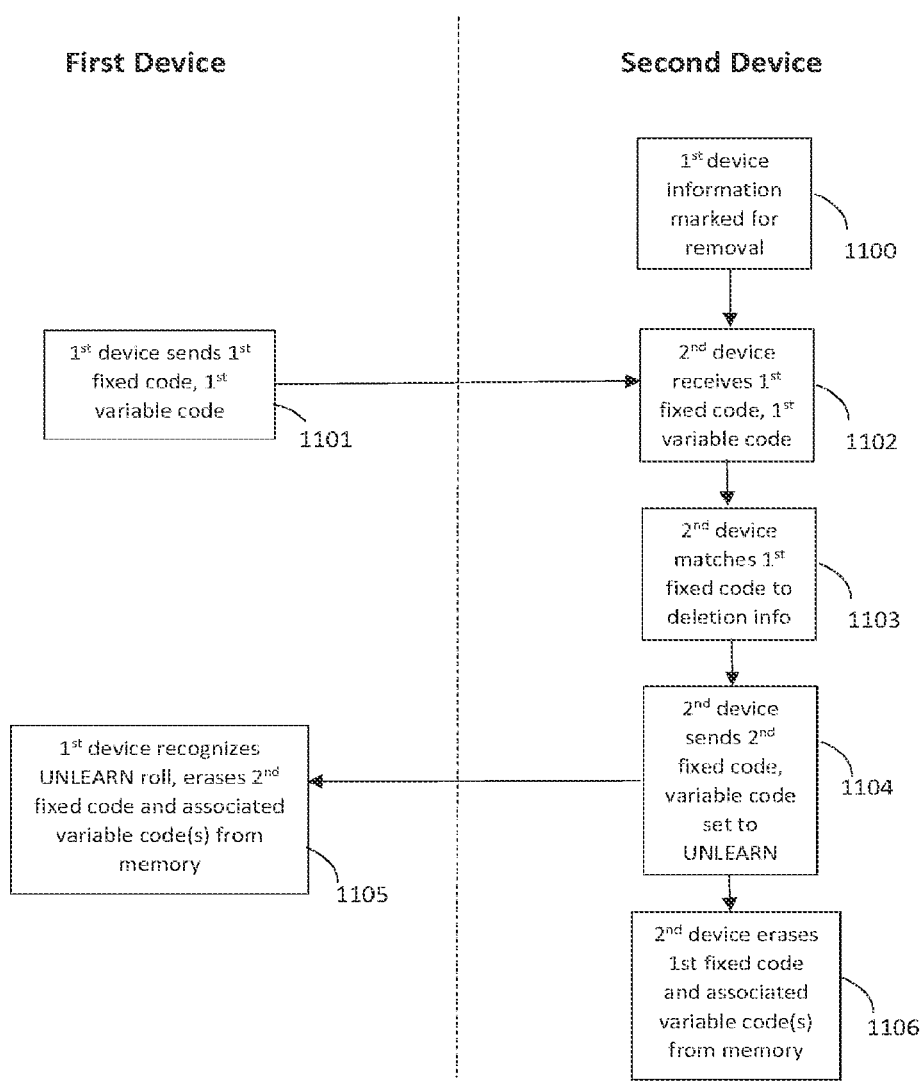
FIG. 14 is a flow diagram showing an example of a process for managing stored information regarding paired devices.

FIG. 14 shows one particular example of managing stored information in paired devices to unpair the devices and delete stored information from each device that relates to the other device. In the flow diagram of FIG. 14 a first device is paired to a second device, and the second device is instructed to unlearn the first device at 1100. This may occur, for instance, if the second device's memory is full and is managed by a first-in-first-out (FIFO) protocol. The information may also be marked for deletion by a user, such as by pressing an "erase all" button configured to unlearn all devices from the second device, or by specifically selecting the first device to unlearn. A fixed and changing code associated with the first device will then be marked for deletion. When the first device is next actuated at 1101, it sends a first fixed code (an identification code for the first device) and a first variable code per its normal operation protocol. At 1102, the second device receives the first fixed code and first variable code, and at 1103 determines that the first fixed code matches a code that has been marked for deletion (for instance, by comparing the incoming message to a deletion list or detecting a value or sequence associated with the version of the first fixed code stored in the second device's memory during a validation process). As a result of determining that the first fixed code is associated with a device marked for deletion, the second device sends at 1104 a message to the first device that includes a second fixed code (an identification code for the second device) and a changing, rolling or variable code set to a specific value or format representing an "unlearn" instruction. For instance, in a rolling code system the second device's rolling code may be set to an "unlearn roll" represented by a low value such as "1" or "2" that is unlikely to be mistaken for a normal rolling code used in operation mode. Ordinarily a rolling code is configured to advance with each operation of the device from which it is sent, and therefore setting the learning roll as a low value avoids situations where use of a device in operation mode inadvertently advances the rolling code to an unlearn roll value. The unlearn roll should differ from any learning roll or other specific rolling code value that is configured to instruct the other device to take a particular action. When the first device receives at 1105 the second fixed code and second variable code from the second device, the first device will recognize the second rolling code is set to an unlearn value, and as a result will erase any stored versions of the second fixed code and second variable code, as well as any other associated stored data. Thus the second device is unlearned from the first device without having to take specific action with respect to the first device, such as a user accessing an interface to manipulate the first device's memory to erase specific values. This also avoids any necessity to simultaneously erase all stored learned device information from the first device. Having instructed the first device to erase information, the second device erases the first fixed code and associated data from the memory of the second device at 1106, thus unlearning the first device.

Figure 15A:
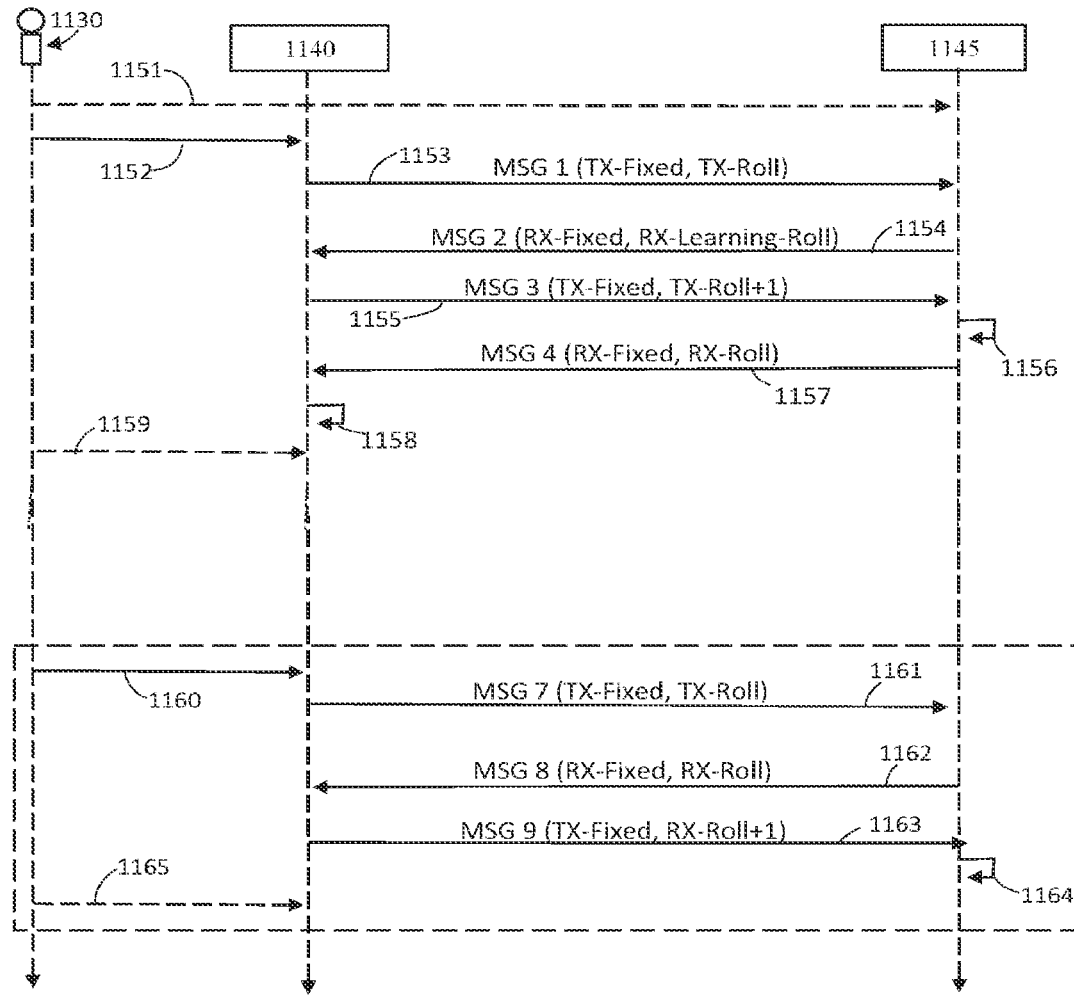
FIG. 15A-C are flow diagrams showing additional examples of processes for managing stored information regarding paired devices.
Figure 15B:
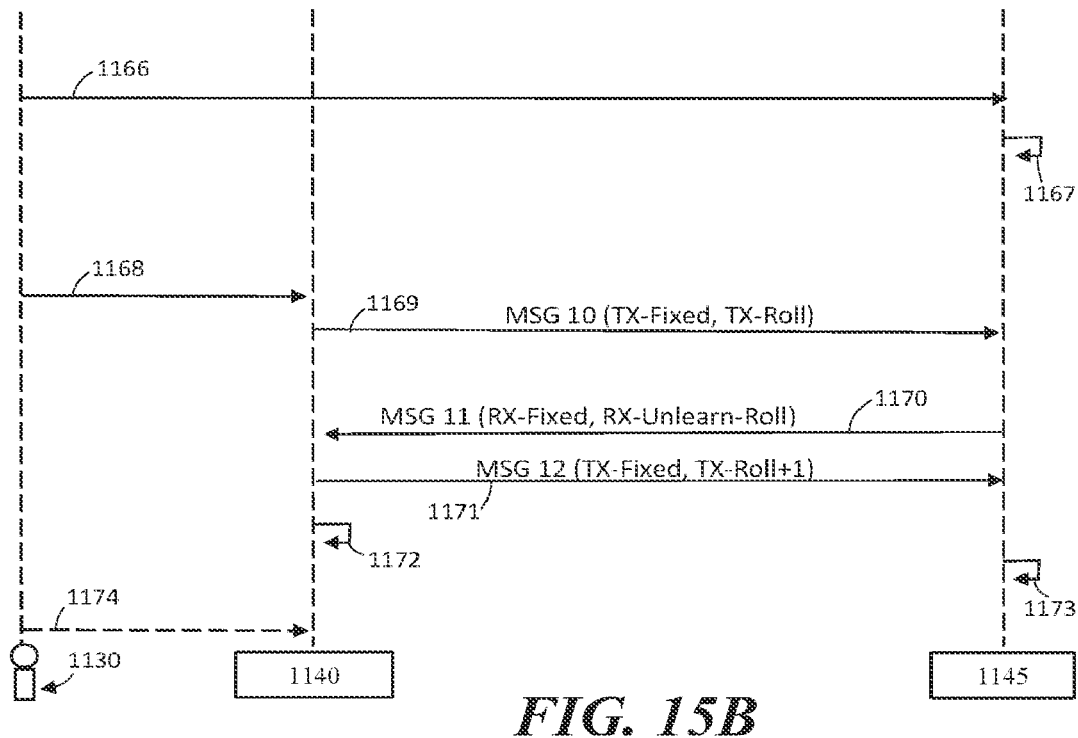

FIGS. 15A and 15B depict a continuous flow diagram showing a data erase protocol similar to that of FIG. 14, but with additional detail regarding the messages exchanged between two devices in order to cause each device to unlearn the other device. FIG. 15A shows a learning protocol and normal operation of the two devices, and FIG. 15B shows a process of erasing stored data from both devices in order for the devices to unlearn one another.

In FIG. 15A, a user 1130 interacts with a Bluetooth Low Energy (BLE) receiver 1145 (e.g. a garage door operator) to set the receiver into learn mode 1151, for instance by pressing a dedicated button on the device. Upon activating 1152 a remote BLE transmitter 1140, a message (MSG1) 1153 is sent including a fixed code (TX-Fixed) and a changing code (TX-Roll) relating to the transmitter 1140. The receiver responds to the first message with a second message (MSG2) 1154 that includes a second fixed code (RX-Fixed) and a second changing code that is set to a specific value indicating that the receiver is in learn mode (RX-Learning-Roll). Optionally, a time window or delay may be calculated by both the transmitter and receiver so that the second message 1154 is only accepted by the transmitter if received at an appropriate time, increasing security of the system. A third message (MSG3) is then sent 1155 by the transmitter to the receiver including the first fixed code (TX-Fixed) and a changed version of the first rolling code (TX-Roll+1). The values from the third message are then stored by the receiver at 1156. The receiver also responds 1157 to the third message with a fourth message (MSG4) including the second fixed code (RX-Fixed) and the second changing code set to an operating value instead of a learn value (RX-Roll). The codes from the fourth message are then saved 1158 to a memory of the transmitter and the transmitter is deactivated 1159. At this point, both the receiver and transmitter have stored the other device's fixed and rolling code values in order to validate incoming transmissions during normal operation. Later, when the transmitter is activated 1160 during normal operation, the transmitter will send a seventh message (MSG7) 1161 including the first fixed code (TX-Fixed) and a current version of the first changing code (TX-Roll). In response, if the receiver validates the seventh message using stored code values and after an optional time window or other additional security step, the receiver will send an eighth message (MSG8) 1162 to the transmitter including the second fixed code (RX-Fixed) and the current version of the second changing code (RX-Roll). The transmitter will compare the code values from the eighth message against stored values, and if it validates the eighth message the transmitter will send a ninth message (MSG9) 1163 including the first fixed code (TX-Fixed) and a changed version of the second changing code (RX-Roll+1). If the receiver validates the ninth message by comparing the first fixed code to a stored value and comparing the changed version of the second changing code to an expected value, then the receiver will execute 1164 the request represented by the communications from the transmitter (e.g. move a garage door). The transmitter will then deactivate 1165. The steps from 1160 to 1165 may be repeated numerous times in day-to-day use of the transmitter and receiver.

FIG. 15B demonstrates an example of a mutual process or method of un-learning or un-pairing the transmitter and receiver that were paired and operated in FIG. 15A. At some point, the transmitter will be selected 1166 to be unlearned by the receiver. For instance, a user may specifically select that the specific transmitter be unlearned, the user may request that all transmitters be unlearned from the receiver, or the receiver may automatically select the transmitter to be unlearned due to issues relating to the receiver's memory capacity. At that point, the receiver will mark the transmitter's fixed code for deletion 1167. The next time that the transmitter is activated 1168, and a message (MSG10) is sent 1169 including the transmitter's fixed code (TX-Fixed), the receiver will recognize the fixed code as marked for deletion in the receiver's memory and respond with a deletion instruction (MSG11) instructing 1170 the transmitter to delete information relating to the receiver. Transmitter will then normally send 1171 another message (MSG12) which will confirm to the receiver that the deletion instruction was received, although the transmitter and receiver could be configured to omit this third message in this sequence. The deletion instruction sent at 1170 is in the normal communication format for messages from the receiver, but includes a specific value for the changing code (RX-Unlearn-Roll) that is configured to cause the transmitter to delete data associated with the fixed code (RX-Fixed) of the message. Upon recognizing that the value of the receiver's changing code is set to an "unlearn" value, the transmitter will remove 1172 the receiver's fixed code (RX-Fixed) and associated changing code values from the transmitter's memory. The receiver will also remove 1173 the transmitter's fixed code (TX-Fixed) and associated changing code values from the receiver's memory. The transmitter will then be deactivated 1174, and communication between the transmitter and receiver ceases. The devices are at this point no longer paired, and the transmitter cannot instruct the receiver to take action unless the learning process shown in FIG. 15A is repeated to pair the devices again.

Figure 15C:
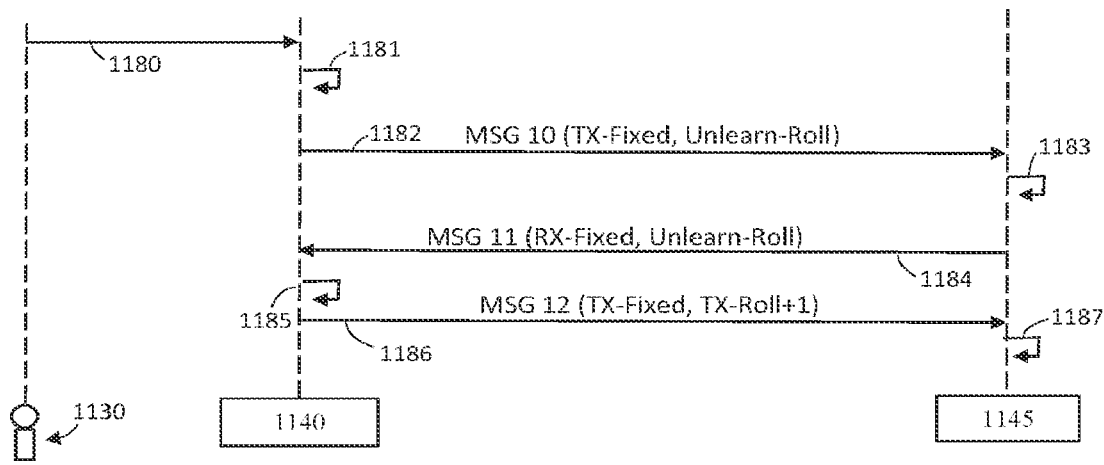

FIG. 15C shows an alternative to the method in 15B that allows the user to instruct a receiver to remove information regarding a specific transmitter by activating that specific transmitter in an unlearn configuration in the presence of a paired receiver. This avoids any need for the user to know how the specific transmitter to be unlearned is identified by the receiver (such as a device name, serial number, etc.). In FIG. 15C, after pairing of a transmitter 1140 and receiver 1145 as shown in FIG. 15A, a user can interact with the transmitter in order to cause the receiver and transmitter to unlearn one another. Thus, in contrast to FIG. 15B, where a receiver 1145 instructs a transmitter to delete information regarding the receiver, in FIG. 15C the transmitter 1140 issues instructions to cause the receiver to delete information from the receiver's memory and unlearn the transmitter. The transmitter 1140 is activated with an unlearn option 1180, for instance by the user pressing an "unlearn" button, entering a series of button presses configured to begin the unlearn process, pressing a specific combination of buttons at the same time, holding one or more buttons for a preset amount of time (e.g. holding a button that normally triggers an operation for six seconds), etc. As a result, the transmitter 1140 assembles 1181 or otherwise builds an unlearn message including the transmitter's fixed code (TX-Fixed), a changing code set to a specific value (Unlearn-Roll) configured to be recognized by the receiver as an instruction to unlearn the transmitter, and optionally a payload. This constructed message is then sent 1182 as a first message (MSG10) in the unlearn process to the receiver in lieu of a message having a normal changing code intended to cause operation of the receiver. In response to receiving the changed code set to the unlearn value, the receiver 1145 will mark for deletion 1183 the fixed code associated with the message from the transmitter (TX-Fixed) and any related data (such as changing code values from previous operations). Alternatively, receiver 1145 may delete information relating to transmitter 1140 at 1183. In addition, after any optional time window or other additional security step included in normal operating protocol, the receiver 1145 will also send a response (MSG11) 1184 that includes the receiver's fixed code (RX-Fixed) and a version of the receiver's changing code set to a specific value (Unlearn-Roll) configured to be recognized by the transmitter 1140 as an instruction to delete information associated with the fixed code of that message, thus identifying to the transmitter which specific information to delete from its memory. The value of the changing code sent by the receiver as an unlearn instruction may be the same or different as the value sent by the transmitter at step 1182. In response to the message from the receiver, the transmitter will delete 1185 the receiver's fixed code and any associated data (such as versions of the receiver's changing code from previous operations). The transmitter may also send a final message (MSG12) 1186 acknowledging or confirming that the receiver's response was read by the transmitter, which will cause the receiver to delete 1187 the information marked for deletion at 1183 if the information has not already been deleted.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of operating a first device configured to communicate with a second device to cause the second device to reconfigure the first device, the method comprising:
    setting at least a portion of a first changing code of the first device to a set value;
    transmitting from the first device a first message that includes at least a first fixed code and the first changing code having the set value;
    receiving by the first device a second message including a second fixed code and second changing code, wherein a portion of the second message is selected by the second device in response to the set value of the first changing code and includes an instruction specifying one of a single-sided learning protocol and a dual-sided learning protocol; and
    reconfiguring a memory of the first device based on the instruction of the portion of the second message selected in response to the set value of the first changing code.

2. The method of claim 1, wherein the second message is configured to instruct the first device to store the second fixed code.

3. The method of claim 2, wherein the second changing code is set to a second set value.

4. The method of claim 1, wherein at least a portion of the second message is configured to instruct the first device to remove information from the memory of the first device.

5. The method of claim 1, wherein the method further includes transmitting a third message from the first device in response to receiving the second message, the third message confirming to the second device that the first device received the second message.

6. An apparatus configured to communicate with a device to cause the device to reconfigure the apparatus, the apparatus comprising a control circuit and a memory, the control circuit configured to:
    set at least a portion of a first changing code to a set value upon being placed in a specific mode;
    transmit a first message that includes at least a first fixed code and the first changing code having the set value;
    receive a second message including a second fixed code and second changing code, wherein a portion of the second message selected by the device in response to the set value of the first changing code and includes an instruction specifying one of a single-sided learning protocol and a dual-sided learning protocol; and
    reconfigure the memory based on the instruction of the portion of the second message selected in response to the set value of the first changing code.

7. The apparatus of claim 6, wherein the control circuit is configured to cause the memory to store the second fixed code based on the portion of the second message selected in response to the set value of the first changing code.

8. The apparatus of claim 6, wherein control circuit is configured to erase information from the memory in response to the portion of the second message when the portion has a second set value.

9. The apparatus of claim 6, wherein the control circuit is further configured to cause the apparatus to transmit a third message, the third message confirming to the device that the apparatus received the second message.

10. A device configured to reconfigure an apparatus upon receiving instructions from the apparatus, the device configured to:

receive from the apparatus a first message that includes at least a first fixed code and a first changing code set to a set value;

select a learning protocol comprising one of single-sided learning protocol or a dual-sided learning protocol based on the first changing code; and send a second message including a second fixed code and second changing code, a portion of the second message including an instruction based on the selected learning protocol, wherein the instruction of the portion of the second message is configured to cause the apparatus to modify a first memory.

11. The device of claim 10, wherein the portion of the second message is configured to cause the apparatus to store the second fixed code in the first memory.

12. The device of claim 11, wherein the portion of the second message is at least a portion of the second changing code.

13. The device of claim 10, wherein the portion of the second message is configured to cause the apparatus to erase information from the first memory.

14. The device of claim 13, wherein the portion of the second message is at least a portion of the second changing code.

15. The device of claim 10, wherein the first memory is a component of the device.

* * * * *